United States Patent [19]

Rubinson et al.

[11] 4,434,487
[45] Feb. 28, 1984

[54] DISK FORMAT FOR SECONDARY STORAGE SYSTEM

[75] Inventors: Barry L. Rubinson; Mark A. Parenti; Richard F. Lary; Edward A. Gardner, all of Colorado Springs, Colo.

[73] Assignee: Digital Equipment Corporation, Maynard, Mass.

[21] Appl. No.: 308,771

[22] Filed: Oct. 5, 1981

[51] Int. Cl.³ ............................................. G06F 11/10
[52] U.S. Cl. ....................................... 371/10; 360/53; 364/200; 371/13
[58] Field of Search ............... 371/10, 13, 38; 360/47, 360/53; 364/200, 900

[56] References Cited

U.S. PATENT DOCUMENTS

| | | | |
|---|---|---|---|
| Re. 31,069 | 10/1982 | Chang et al. | 360/53 |
| 3,059,266 | 10/1962 | Cleveland | 371/13 |
| 4,037,091 | 7/1977 | Beuscher | 371/13 |
| 4,152,695 | 5/1979 | Democrate et al. | 371/10 |
| 4,214,280 | 7/1980 | Halfhill et al. | 360/53 |

Primary Examiner—Charles E. Atkinson
Attorney, Agent, or Firm—Cesari and McKenna

[57] ABSTRACT

In a disk mass storage facility for data processing systems, a disk format which improves handling of defective segments of medium and reduces access time. The format has three layers. A first, physical layer comprises the bytes, sectors and collections of sectors, as well as error detection and correction codes. A second, logical layer is used to address the physical layer and to collect together sectors to form a multiplicity of separately addressable spaces, with each space having a distinct functional utility. At a third, functional layer the use of data fields in each space is specified. This layer governs the handling of bad blocks if required, and the use of certain format information. Handling of bad blocks is controlled by a hierarchically layered process. A portion of each disc, distributed across the medium, is reserved as spare sectors to replace defective sectors. After a bad sector is replaced, future attempts to access the bad sector are redirected (i.e., revectored) to the replacement sector. For the simplest revectoring, the bad block is replaced by a replacement block in a known location. If that cannot be done, multiple copies of the replacement block's header are stored in the bad block's data field and the copies are compared to find the replacement address. If the comparison fails, or the header cannot be read, a back-up table is available to match the available replacement addresses with the original address which was replaced. A special code is used to identify blocks wherein the medium is good but the contents of the block are logically corrupted.

18 Claims, 36 Drawing Figures

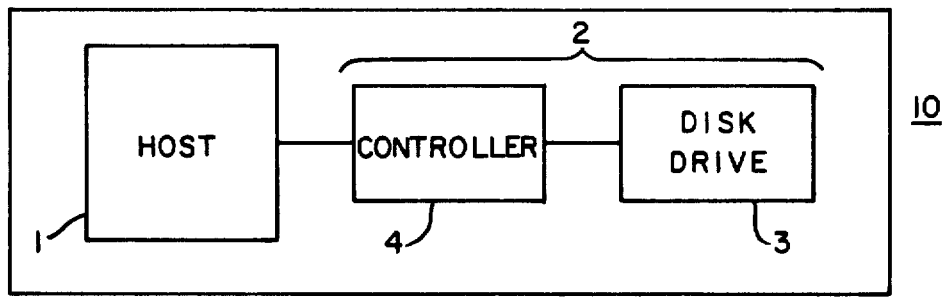
Fig. IA
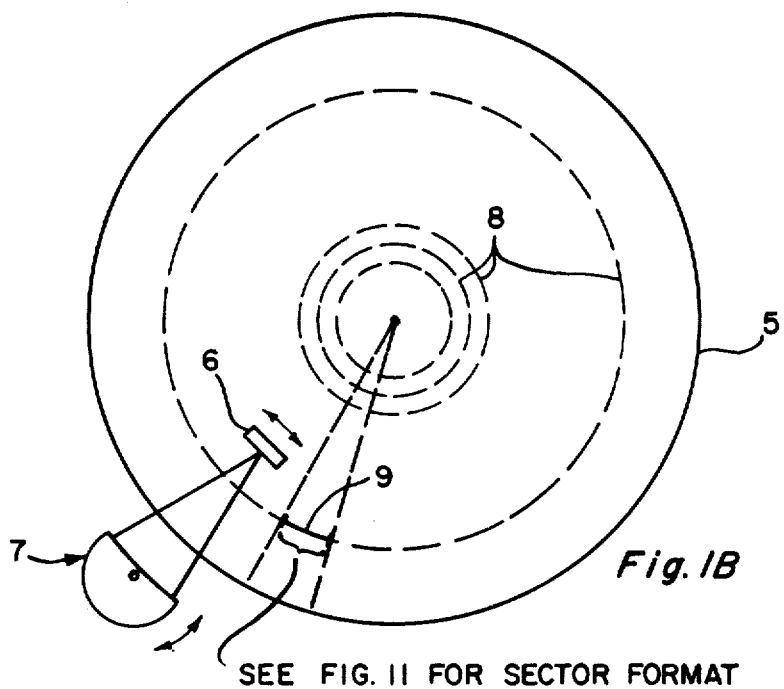
Fig. IB
SEE FIG. II FOR SECTOR FORMAT

```
BOOLEAN PROCEDURE MULTI-READ(TARGET,COPY_SIZE,N,DATA_BLK);
INTEGER TARGET,COPY_SIZE,N;
INTEGER ARRAY DATA_BLK (0:143);
INTEGER BLOCK,NEXT,I;
BEGIN

BLOCK := TARGET;
        NEXT := 0;

LOOP:   READCOMPARE(BLOCK)DATA_BLK;
        IF ERROR THEN
        BEGIN

NEXT := NEXT + 1;
                IF NEXT = N THEN GOTO EXIT;
                BLOCK := BLOCK + COPY_SIZE;
                GOTO LOOP;

END;
EXIT:   MULTI-READ := NEXT <> N;
        EXIT;
    END;
```

*Fig. 2*

```
BOOLEAN PROCEDURE MULTI-WRITE(TARGET,COPY_SIZE,N,DATA_BLK);
INTEGER NEXT,ERR_COUNT,BLOCK;
BEGIN

BLOCK := TARGET;
        NEXT := ERR_COUNT := 0;

LOOP:   WRITECOMPARE(BLOCK)DATA_BLK;
        IF UNRECOVERABLE ERROR THEN BEGIN

ERR_COUNT := ERR_COUNT + 1;
                WRITE_FORCE_ERROR(BLOCK) DATA_BLOCK;

END;
        NEXT := NEXT + 1;
        IF NEXT = N THEN GOTO DONE;
        BLOCK := BLOCK + COPY_SIZE;
        GOTO LOOP;
DONE:   MULTI-WRITE := ERR_COUNT < N;
END;
```

*Fig. 3*

| Ref | Field | Word |
|---|---|---|
| 278 | RESERVED | WORD 5 |
| 280 | LOW ORDER LBN BEING REPLACED | WORD 6 |
| 282 | HIGH ORDER LBN BEING REPLACED | WORD 7 |
| 284 | LOW ORDER RBN REPLACEMENT | WORD 8 |
| 286 | HIGH ORDER RBN REPLACEMENT | WORD 9 |
| 288 | LOW ORDER BAD RBN | WORD 10 |
| 290 | HIGH ORDER BAD RBN | WORD 11 |
| 292 | LOW ORDER CACHE ID | WORD 12 |
| 294 | CACHE ID | WORD 13 |
| 296 | CACHE ID | WORD 14 |
| 298 | HIGH ORDER CACHE ID | WORD 15 |
| 300 | LOW ORDER CACHE INCARNATION NUMBER | WORD 16 |
| 302 | HIGH ORDER CACHE INCARNATION NUMBER | WORD 17 |
| 304 | LOW ORDER FORMAT TIME AND DATE | WORD 18 |
| 306 | FORMAT TIME AND DATE | WORD 19 |
| 308 | FORMAT TIME AND DATE | WORD 20 |
| 310 | HIGH ORDER FORMAT TIME AND DATE | WORD 21 |
|  | RESERVED |  |
|  | RESERVED | WORD 255 |

Fig. 7B

PROCEDURE HASH(LBN,RCT⊥BLOCK,RCT⊥OFFSET);
BEGIN

RCT⊥BLOCK   := QUO((QUO(LBN/1)*R)/238)+H+2;

RCT⊥OFFSET  := REM((QUO(LBN/1)*R)/128;

END;

Fig. 10

| | |
|---|---|
| RCT⊥BLOCK | = THE HOST LBN ADDRESS OF THE SECTOR, IN THE FIRST RCT COPY, CONTAINING EITHER THE RBN DESCRIPTOR OR THE FIRST EMPTY DESCRIPTOR ENCOUNTERED (IF ANY). |
| RCT⊥OFFSET | = THE 32-BIT OFFSET WITHIN THE ABOVE BLOCK, OF EITHER THE RBN DESCRIPTOR OR THE FIRST EMPTY DESCRIPTOR (IF ANY). |
| LBN | = THE HOST LBN BEING SEARCHED FOR. |
| RESULT | = AN INTEGER INDICATING THE RESULT OF THE SEARCH; 0 = PRIMARY EMPTY, 1 = SECONDARY EMPTY, 2 = FULL TABLE (NO MATCH). |
| RBN | = THE UNIT RELATIVE RBN CORRESPONDING TO RCT-BLOCK AND RCT-OFFSET. |
| MATCHFLAG | = FLAG INDICATING MATCH STATUS<br>0 = NO MATCH FOR THIS LBN<br>1 = RBN IN MATCHRBN WAS MATCH FOR THIS LBN |
| MATCHRBN | = RBN WHICH MATCHED THIS LBN |

Fig. 9A

```
PROCEDURE
SEARCH(LBN,RCT_BLOCK,RCT_OFFSET,RESULT,RBN,BLOCK,MATCHFLAG,MATCHRBN))
    INTEGER LBN, RCT_BLOCK,RCT_OFFSET,RESULT,RBN
    INTEGER EMPTYTYPE,RESCAN,DELTA,START_OFFSET,N
    INTEGER ARRAY BLOCK (0:143);
    BEGIN
        HASH(LBN,RCT_BLOCK,START_OFFSET);

MATCHFLAG := 0;
        EMPTYTYPE := 0;
        RESCAN := 0;
NEXT:
        IF NOT MULTI-READ(RCT_BLOCK,(RET+RCT.PAD),N,BLOCK) THEN GOTO FAIL;
        DELTA :=0;
TEST:
        RCT_OFFSET :=START_OFFSET + DELTA;
        IF RCT_OFFSET <0 OR RCT_OFFSET > 127 THEN GOTO BUMPDELTA;
        IF BLOCK(RCT_OFFSET) = 0 THEN BEGIN

RESULT := EMPTYTYPE;
            GOTO FINISH;
    END;
    EMPTYTYPE := 1;
    IF BLOCK(RCT_OFFSET).[29] = 1 THEN BEGIN
            IF BLOCK(RCT_OFFSET).[27:0] = LBN THEN BEGIN
                    MATCHFLAG := 1;
                    MATCHRBN :=((RCT_BLOCK - (H+2)) * 128) + (RCT_OFFSET);

END;
    END;
    IF BLOCK(RCT_OFFSET).[31] = 1 THEN BEGIN
        IF RESCAN = 1 THEN GOTO FAIL;
        RESCAN := 1;
```

*Fig. 9B*

```
                    START_OFFSET := 0;
                    RCT_BLOCK := H + 2;
                    GOTO NEXT;
            END;
BUMPDELTA:
            DELTA := - DELTA
            IF DELTA >= 0 THEN DELTA := DELTA + 1;
            IF DELTA <128 THEN GOTO TEST;
            START_OFFSET := 0;
            RCT_BLOCK := RCT_BLOCK + 1;
            GOTO NEXT;
FAIL:
            RESULT := 2;
            EXIT;
FINISH:
            RBN := ((RCT_BLOCK - (H + 2)) * 128) + (RCT_OFFSET);
    END;
```

*Fig. 9C*

```
        I := [256 OR 288];        SET INITIAL BLOCK SIZE.
        J := 0;                   POINT TO FIRST DATA WORD.
        EDC := 69;                SET INITIAL VALUE.
LOOP:   EDC : XOR(EDC,DATA[J]);   XOR NEXT DATA WORD TO EDC.
        J := J + 1;               COMPUTE NEXT DATA WORD LOCATION.
        EDC := CIRCLFTSH(EDC);    ROTATE THE EDC 1 BIT TO THE LEFT.
        IF J <I THEN GOTO LOOP;   LOOP IF NOT DONE.
        MATCH := EDC=DATA[J];     TRUE IF GOOD EDC.
```

FACTORY FORMATTED CYL (512 BYTE FORMAT)

```
CYLINDER-NUMBER   = C+QUO((LBN-L)/(g*t*1))
GROUP-NUMBER      = QUO(REM((LBN-L)/(g*t*2))/(t*1))
TRACK-NUMBER      = QUO(REM((LBN-L)/(t*1))/1)
SECTOR-NUMBER     = REM((LBN-L)/1)
SECTORS-FRM-INDX  = REM((SECTOR-NUMBER+(o*GROUP-NUMBER))/s)
```

*Fig. 19*

```
CYLINDER-NUMBER   = C+QUO((RBN-R)/(g*t*r))
GROUP-NUMBER      = QUO(REM((RBN-R)/(g*t*r)/(t*r))
TRACK-NUMBER      = QUO(REM((RBN-R)/(t*r))/r)
SECTOR-NUMBER     = REM((RBN-R)/r)+1
SECTORS-FRM-INDX  = REM((SECTOR-NUMBER+(o*GROUP-NUMBER))/s)
```

*Fig. 20*

```
CYLINDER-NUMBER   = C+Lc+QUO((XBN-X)/(g*t*s))
GROUP-NUMBER      = QUO(REM((XBN-X/(g*t*s)))/(t*s))
TRACK-NUMBER      = QUO(REM((XBN-X)/(t*s))/s)
SECTOR-NUMBER     = REM((XBN-X)/s)
SECTORS-FRM-INDX  = REM((SECTOR-NUMBER+(o*GROUP-NUMBER))/s)
```

*Fig. 21*

```
CYLINDER-NUMBER   = C+Lc+Xc+QUO((DBN-D)/(g*t*s))
GROUP-NUMBER      = QUO(REM((DBN-D)/(g*t*s))/(t*s))
TRACK-NUMBER      = QUO(REM((DBN-D)/(t*s))/s)
SECTOR-NUMBER     = REM((DBN-D)/s)
SECTORS-FRM-INDX  = REM((SECTOR-NUMBER+(o+GROUP-NUMBER))/s)
```

*Fig. 22*

```
PROCEDURE COMPARE-128(VALUE,BLOCK,SUCCESS);
INTREGER ARRAY BLOCK(0:143);
INTEGER I,J,COUNT,VALUE;
BOOLEAN SUCCESS;
CONSTANT MATCH =24;
BEGIN
   J := COUNT := 0;
   WHILE ( J < 128 - MATCH ) AND ( COUNT < MATCH) DO
BEGIN
        VALUE := BLOCK(J);
        J := J + 1;
        I := J;
        COUNT := 0;
        WHILE (I < 128) AND (- MATCH < COUNT) AND (COUNT < MATCH) DO
        BEGIN
                IF (BLOCK(I) = VALUE) THEN COUNT := COUNT + 1 ELSE
                COUNT := COUNT - 1;
                I := I + 1;
        END;
    END;
    SUCCESS := (COUNT > = MATCH);
END;
```

*Fig. 23*

| | | | | |
|---|---|---|---|---|
| MEDIA MODE | WORD 0 | | | |
| FORMATTING INSTANCE NUMBER | WORD 1 | | | |
| VOLUME SERIAL NUMBER LEAST SIGNIFICANT WORD | WORD 2 | NUMBER OF USED ENTRIES IN 512 TABLE (HIGH) | WORD 14 |
| VOLUME SERIAL NUMBER | WORD 3 | NUMBER OF USED ENTRIES IN 512 TABLE (HIGH) | WORD 15 |
| VOLUME SERIAL NUMBER | WORD 4 | NUMBER OF USED ENTRIES IN 576 TABLE (LOW) | WORD 16 |
| VOLUME SERIAL NUMBER MOST SIGNIFICANT WORD | WORD 5 | NUMBER OF USED ENTRIES IN 576 TABLE (HIGH) | WORD 17 |
| DATE THAT VOLUME WAS FIRST FORMATTED (LOW) | WORD 6 | XBN OF SCRATCH AREA IN THIS COPY (LOW) | WORD 18 |
| DATE THAT VOLUME WAS FIRST FORMATTED | WORD 7 | XBN OF SCRATCH AREA IN THIS COPY (HIGH) | WORD 19 |
| DATE THAT VOLUME WAS FIRST FORMATTED | WORD 8 | SIZE OF SCRATCH AREA IN THIS COPY | WORD 20 |
| DATE THAT VOLUME WAS FIRST FORMATTED (HIGH) | WORD 9 | ZEROS | |
| DATE OF MOST RECENT VOLUME FORMATTING (LOW) | WORD 10 | | |
| DATE OF MOST RECENT VOLUME FORMATTING | WORD 11 | ZEROS | WORD 255 |
| DATE OF MOST RECENT VOLUME FORMATTING | WORD 12 | | |
| DATE OF MOST RECENT VOLUME FORMATTING (HIGH) | WORD 13 | | |

*Fig. 25*

DISK FORMAT FOR SECONDARY STORAGE SYSTEM

CROSS-REFERENCE TO RELATED APPLICATIONS

This application relates to a data processing system, other aspects of which are described in the following commonly assigned applications filed on even date herewith, the disclosures of which are incorporated by reference herein to clarify the environment, intended use and explanation of the present invention:

Ser. No. 308,826, titled Interface Between a Pair of Processors, Such as Host and Peripheral-Controlling Processors In Data Processing Systems and Ser. No. 308,593, titled Storage Facility Employing Serial Communication Between Drive and Controller.

FIELD OF THE INVENTION

This invention relates to the field of data processing systems and, in particular, to the formatting of disk type mass storage facilities in such systems. This invention further relates primarily to such facilities which use fixed block, rather than variable block architecture.

BACKGROUND AND SUMMARY OF THE INVENTION

Secondary storage subsystems, such as disk drives, are an important part of modern data processing systems. Such subsystems provide a large volume of memory for storing programs and data. In disk drives, rotating disks with magnetic recording material provide the actual storage medium.

A primary objective in the use of such secondary storage subsystems is to minimize the time required to read or write information at a specific address on a disk surface from a starting point at another address position. The access time to move a read/write head to the desired target address is a function both of physical parameters of the disk drive (e.g., how fast the drive's electronic control circuits can determine and supply appropriate signals to that actuator) and of the addressing scheme employed (which will determine the physical spacing between starting and target addresses).

Another objective of such subsystems is to achieve high reliability in writing and reading data. Unfortunately, the medium is not perfect. Portions of the oxide surface of the medium may be manufactured defectively; other portions may degrade and wear out under conditions of long-term use. If information is written (i.e., recorded) on such areas, it cannot be stored or read (i.e., retrieved) reliably.

Error detection and correction techniques are, of course, part of the solution to this problem. However, error detection and correction may not be enough where the medium will not permit the recording of a sufficient portion of a block so as to allow those techniques to be invoked successfully when the block is read. It is therefore important to avoid the use of portions of the medium which are found to be so bad that information will be unrecoverable or where the information may degrade to an unrecoverable state. In the prior art, several approaches or techniques have evolved for dealing with this problem.

A first technique simply invalidates an entire track when too much of it is bad. All of the information intended for that track is redirected to a substitute track. It will be readily apparent that this scheme may discard a lot of good medium with the bad. Further, only a limited number of substitute tracks can be made available without significantly detracting from the usable volume of medium.

A second technique, which is much less drastic, invalidates the bad sector and does not use bad blocks. This, however, creates problems when transferring the contents of one disk surface to another disk surface, since it is statistically almost impossible to find the same bad blocks on two different surfaces. An additional disadvantage of this technique is that it causes holes in the logical addressing space.

A third technique is to provide on each track a limited amount of space which can be used to substitute for bad portions of sectors on that track by skipping over the defective area and pushing the remainder of the sector further down the track. This technique is helpful only up to the point where the defective area on a track does not exceed the reserved portions. It also causes sectors on different tracks to lose their alignment, causing problems in achieving real-time head switching.

A fourth technique is to reserve "n" sectors per track. Bad blocks are then either revectored (i.e., redirected) to one of those sectors on that track, or all blocks subsequent to a bad block are "slid" down, without revectoring. This limits replacement to those sectors, per track however.

A fifth technique is to reserve some portion of the disk and to revector from the bad blocks to the reserved region through a table. This approach has the disadvantage of poor performance.

Since bad blocks can occur both during manufacturing and then subsequently during the use of the disk, it is important that bad block replacement be performed both initially, before the medium is first used to store host information, and later, when dynamic conditions give rise to appropriate circumstances. Prior art techniques are not very good for both cases.

The present invention deals with this problem in a hierarchial, multi-level fashion. An evenly distributed portion of each disk is reserved as spare sectors for replacing defective sectors. After a bad sector has been replaced, future attempts to access the bad sector are redirected (i.e., re-vectored) to the replacement sector. Three levels of revectoring mechanism are illustrated; they differ in the way that the address of a replacement block is determined. It is possible, optionally, to trade off performance against complexity by electing not to employ all of these mechanisms.

In the primary revectoring mechanism, the position of the replacement block is implied by the position of the bad block and the need to revector is indicated by a code in the header. Each track is provided with one or more replacement sectors. The implied primary replacement block for a bad block is the first replacement sector on its track. In the secondary revectoring mechanism, the need to revector is signalled by a code in the header. The location of the replacement block is arbitrary. To determine its address, multiple copies of the replacement block's header value are stored in the data field of the bad block. The copies are read and compared statistically to come up with the address so indicated. Finally, there is a so-called tertiary revectoring mechanism used when the header copy comparison fails to yield a valid value or when the multiple copies of the replacement address in the secondary scheme do not meet the statistical matching requirement. For implementation of this mechanism, there are stored on the disk multiple copies of a table containing a list of each replacement block and the address of any bad block mapped to it; if any. This table is searched to find the appropriate replacement address.

A unique logical addressing scheme also is employed, collecting sectors according to a hierarchy of geometrical and access time considerations. This permits sectors to be addressed logically, rather than physically; they are self-defining in terms of physical locations, so as to optimize sector access time latencies. This, combined with revectoring, provides a logically contiguous address space at all times—i.e., one without holes.

A further aspect of this invention is that the disk is divided into different regions which comprise separate logical areas—one available to users, one for replacement of bad blocks, one for diagnostics, and one for recording certain information regarding disk formatting. Each is a logically self-consistent, but different, addressing space.

Initially, a disk is "inspected" for sectors which are bad when the disk is manufactured. These are replaced during the manufacturing process or at installation. Other sectors are replaced as they start to degrade in quality, but before they produce an error rate exceeding the capabilities of the error correcting code (ECC) which is employed. (This ECC "threshold" is specified by the drive itself.) Other sectors are replaced after they degrade and are not readable; this requires notification that the data is corrupted.

Yet another feature of this invention is the use of a special code to distinguish sectors which contain logically corrupted information, but wherein the medium itself is usable. This special code is referred to as the "forced error" indicator; in the implementation described below, it is the one's complement of an error detecting code (EDC) generated by the information in a sector's data field in accordance with a preselected algorithm, and appended to the data field of the sector. When a sector is read, its EDC is computed and compared with the EDC recorded on the disk. If the comparison reveals that the EDC field is recorded as the one's complement of the computed EDC, the forced error indicator has been detected. The host is thereby notified that the data is logically bad, but the medium is not known to be impaired. This indicator is useful, for example, during an offline volume copy, when the data in the block is found to be physically corrupted and uncorrectable, but must be copied to a physically good sector on another volume. In order to allow hosts which access the copy to know that the data there is corrupted and unreliable, the forced error indicator is set in that sector. The next time information is written to this sector, the forced error indicator will be cleared, since the medium itself is good and only the information previously written to the medium was bad.

Use of the forced error indicator follows three rules: first, a read operation from a block where the forced error indicator is set must always fail. Second, a write operation to such a block must clear the forced error indicator. Third, a read operation must produce a unique error code so as to differentiate the detection of a forced error from any other read error.

It should be appreciated that this forced error indicator is not part of the data bytes transferred; it is control information generated when the sector is written.

The contents of certain portions of the disk which are not protected by replacement are protected by virtue of being written in multiple locations, to store multiple copies of the same information. If a sufficient number of copies, or portions of copies, are recorded unimpaired, the recorded information can be retrieved despite the corruption of one or more copies.

BRIEF DESCRIPTION OF THE DRAWINGS

FIG. 1A is a generalized block diagram of a data processing system in which the present invention may be utilized;

FIG. 1B is a diagrammatic illustration of a disc surface in the disk drive of FIG. 1A, according to the invention;

FIG. 2 is an exemplary procedure for reading information protected by the multi-copy mechanism disclosed herein;

FIG. 3 is an exemplary procedure for writing information onto a disk according to the multi-copy protection mechanism;

FIGS. 7A and 7B are a diagrammatic illustration of the contents of sector zero of the RCT of FIG. 6;

FIGS. 9A-9C, together, are a listing of an exemplary procedure for implementing the RCT search alogrithm of FIG. 8;

FIG. 10 is a listing of an exemplary procedure for implementing the RCT hash algorithm described herein;

FIG. 19 is a listing of a procedure for determining a logical block's sector address;

FIG. 20 is a listing of a procedure for determining a replacement block's sector address;

FIG. 21 is a listing of a procedure for determining an external block's sector address;

FIG. 22 is a listing of a procedure for determining a diagnostic block's sector address;

FIG. 23 is a listing of an exemplary procedure for reading 128 copies of an RBN's header to determine reliably the correct value of that header;

FIG. 25 is a diagrammatic illustration of sector zero of each FCT copy.

DETAILED DESCRIPTION OF A PREFERRED EMBODIMENT

Figure 1C:
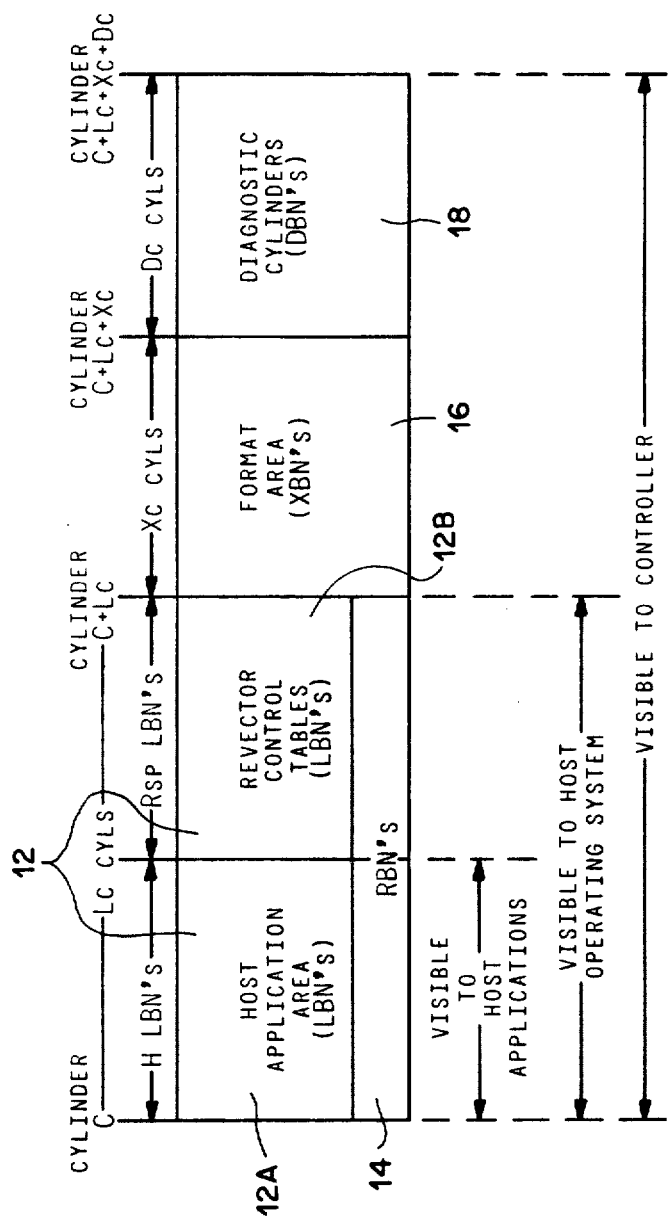
FIG. 1C is a diagrammatic illustration of the logical spaces provided on a disk, according to the present invention.
Figure 4A:
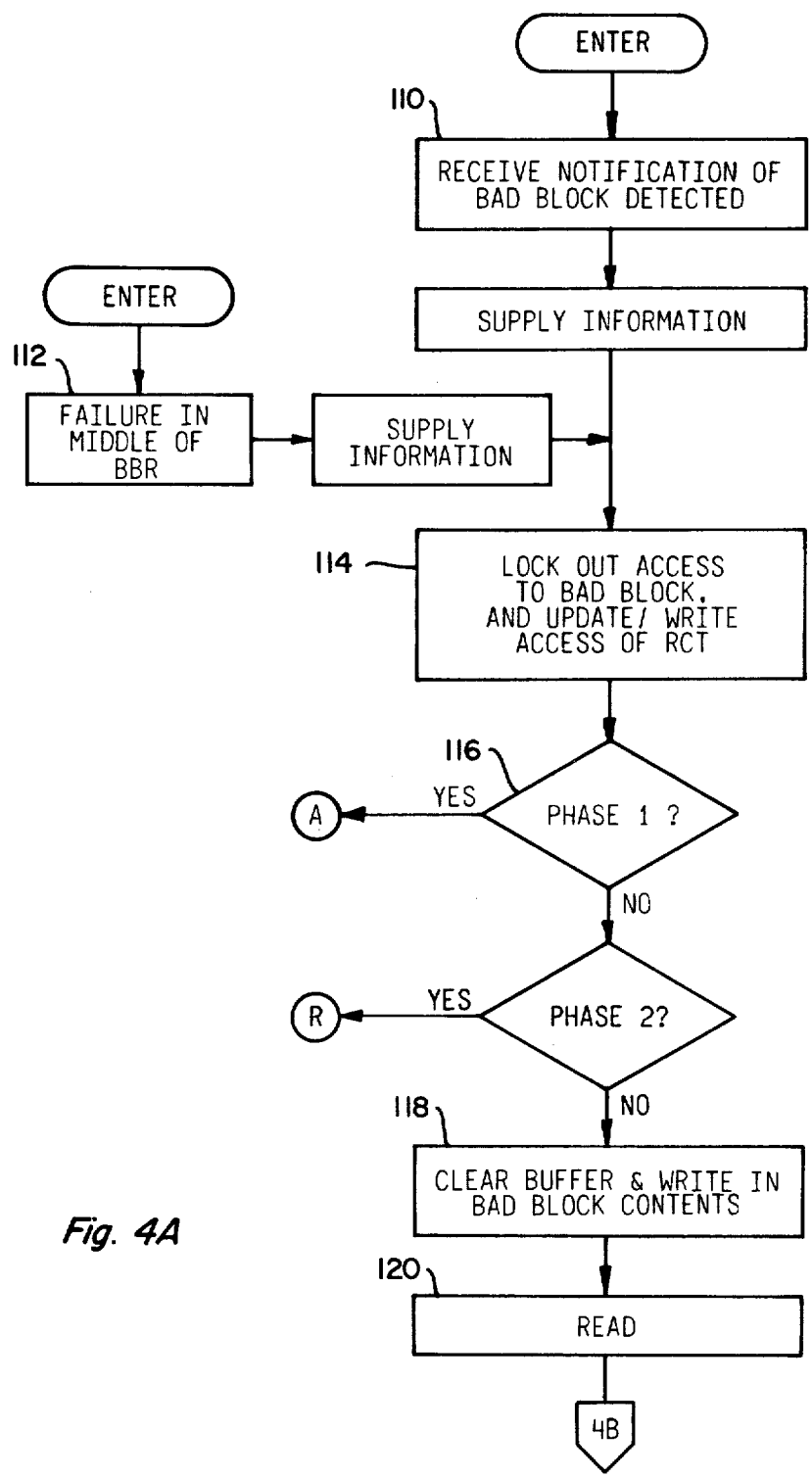
FIGS. 4A-4D are a flow chart of the bad block replacement procedure of the present invention.
Figure 4B:
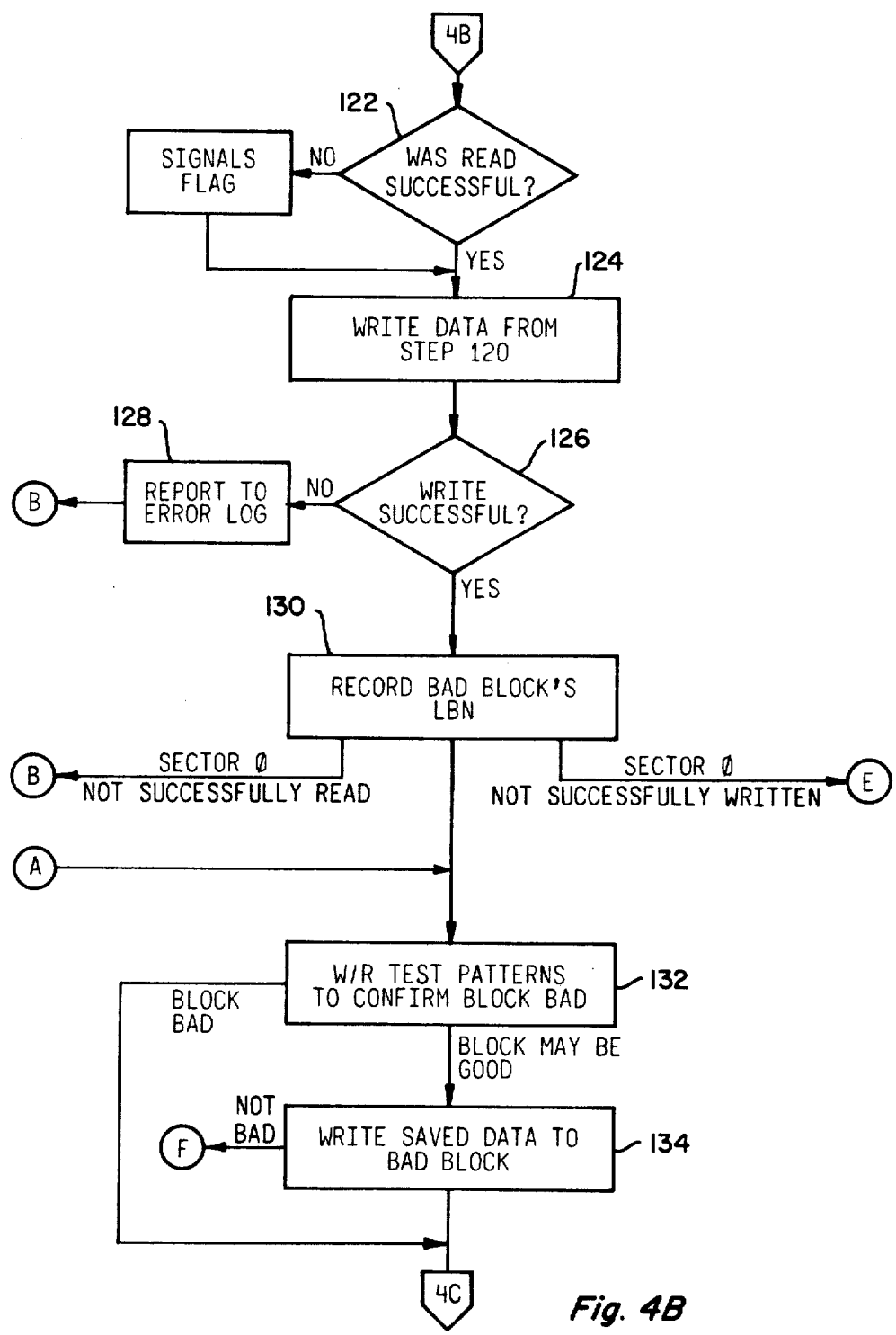
Figure 4C:
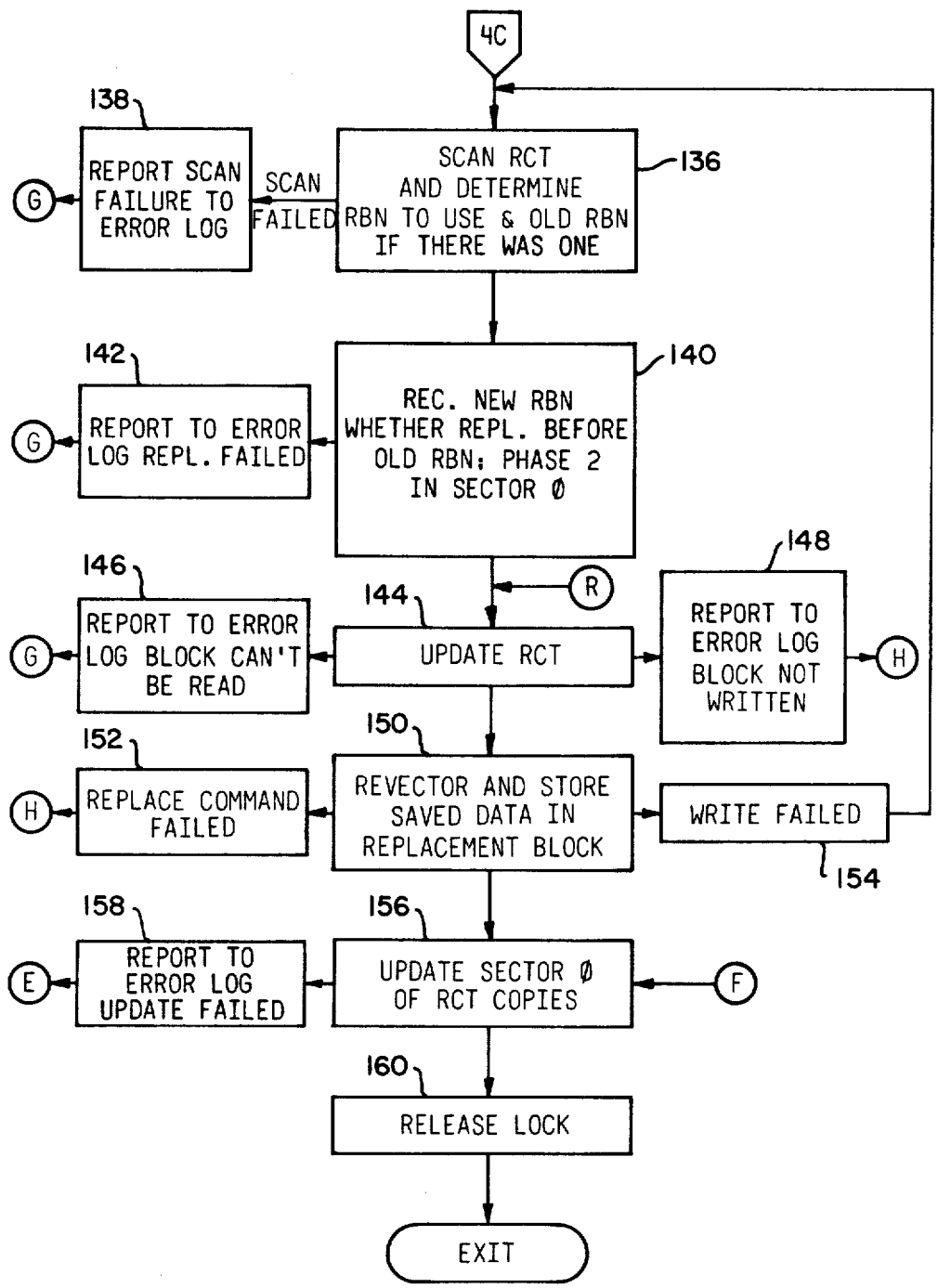
Figure 4D:
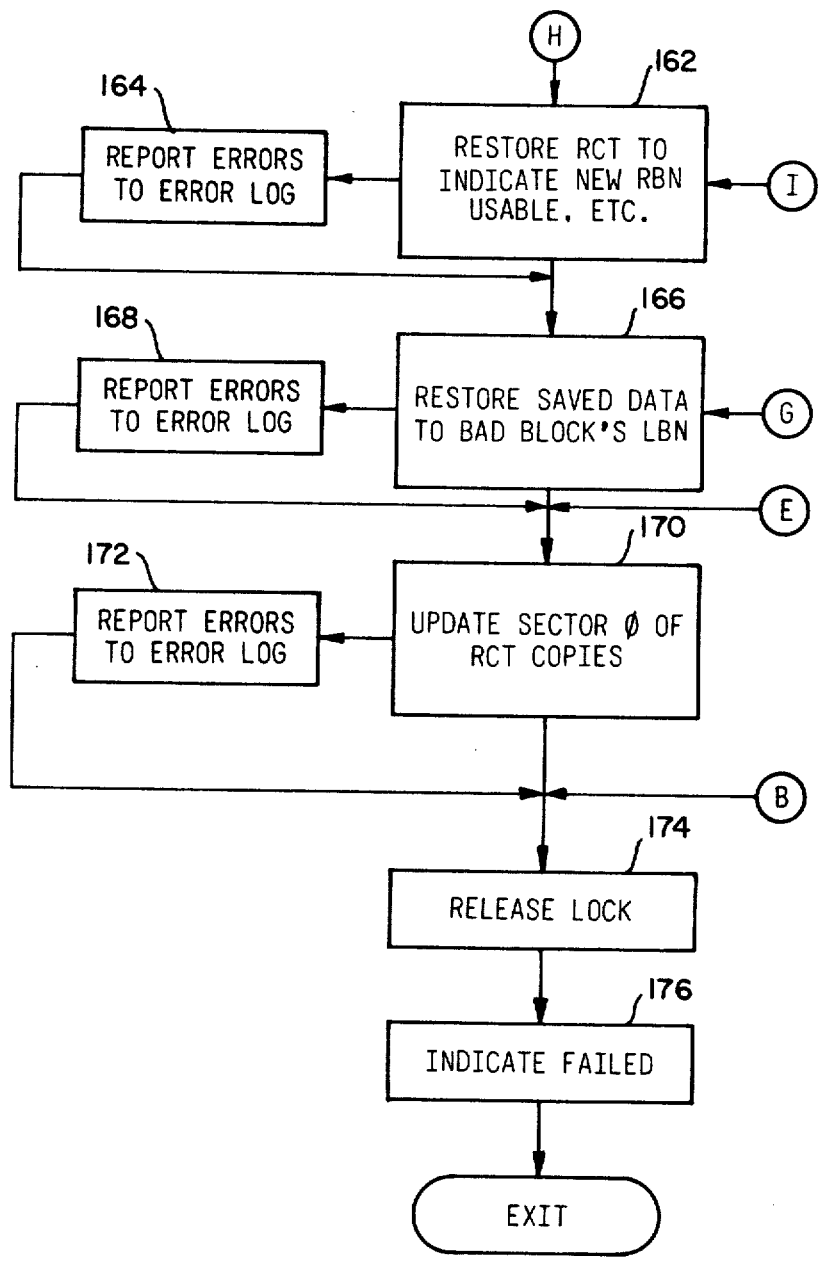

A generalized block diagram of a data processing system which can utilize the present invention is shown in FIG. 1. That system includes a host computer 1 (having a central processor, main memory and input/output devices, not shown) and a secondary storage subsystem 2. The secondary storage subsystem, in turn, includes a disk drive 3 and a controller 4 for that disk drive. The controller 4 typically contains one or more processors of its own and provides proper signals for actuating the drive to read or write information in accordance with instructions from the host processor.

The present invention utilizes a unique disk format to improve defect handling and reduce access time. It further serves to protect certain selected areas of a disk by storing multiple copies, and facilitates adaptation to peripheral device timing characteristics. This format comprises an architecture composed of three layers. First, there is a physical layer, comprising the actual bytes, sectors, and collections of sectors on the disk. This layer also includes an error detection and correction mechanism. Second, there is a logical layer, which is the level at which the physical layer is addressed and grouped into spaces, with particular uses assigned to those spaces. Third, there is a functional layer, which is the level at which the use of data fields in each space is described. This layer includes the handling of bad blocks, if required, and other format usage information.

What follows generally is a detailed description of each of those layers. Before proceeding, however, it will prove useful to define certain terminology used herein.

A "sector" is the smallest unit by which data is addressed physically on a disk surface. Each sector occupies a specific physical position relative to an index location on a disk, and has the property that it is available for reading or writing once per disk rotation.

Sectors are grouped together hierarchically for addressing purposes. First, a disk surface is divided into one or more "cylinders." In turn, cylinders are divided into "groups;" and groups are divided into "tracks."

A "track" is a logical entity comprising a set of sectors occupying contiguous logical disk locations.

A "group" is, in turn, a logical entity representing a set of tracks such that individual tracks in a group can be selected within the inter-sector rotation time. Tracks in the same group are "aligned" such that the same physical sector address is available simultaneously for reading or writing on all tracks in the group.

A "cylinder" is a logical entity representing a collection of groups which can be selected via an operation with latencies less than the minimum "seek" time. Cylinders have the additional property that the selection of a new cylinder requires the longest average head-positioning operation. Groups within a cylinder are offset such that spiraling between adjacent graps is accomplished without the loss of a full revolution of the disk.

The terms track, group and cylinder simply relate collections of sectors to each other as a function of access time considerations. They are independent of physical organization or construction of the device.

The "sector number" portion of a sector address is always the low order portion. The "track number" portion of a specific sector address is always the middle portion of that address between the group and sector portions. The "group number" portion of a specific sector address is always a middle portion of that address between cylinder and track. The "cylinder number" portion of a specific sector address is always the highest order portion of that address.

A "bad block" is a sector containing a defect which either (1) causes an error exceeding the correction capability of the error correction scheme used by the subsystem, or (2) exceeds a drive-specified error threshold beyond which the continued integrity of data in the sector cannot be guaranteed. A bad block may also be a sector which is defective to such an extent that, while data integrity is still assured, the overhead imposed by the required error correction procedure is greater than will be tolerated.

"Bad block replacement" is the designation of a spare sector (i.e., replacement block) to substitute for a bad block.

"Bad block revectoring" denotes the act of transferring a read or write operation to the replacement block associated with a bad sector upon access thereto.

A "physical block number" (PBN) is a number which identifies a sector's physical position within the set of sectors on a mass storage device.

A "logical block number" (LBN) is a number identifying a sector's relative position within the set of sectors directly accessible to the host. These are used for host data storage and revector control information.

A "replacement block number" (RBN) is a number which identifies a sector's relative position within the set of sectors used as replacements for bad sectors.

A "primary replacement block" is a replacement block with a designated RBN on a track which has been allocated to replace a logical block on the same track.

A "secondary replacement block" is a replacement block which is not a primary replacement block. It is either not the replacement block with the designated RBN of the primary replacement block on a track or is allocated to replace a logical block located on another track.

An "external block number" (XBN) is a number which identifies a sector's relative position within the set of sectors in the external format area.

A "diagnostic block number" (DBN) is a number which identifies a sector's relative position within the set of sectors in the diagnostic area.

A "host" is a central processing unit serviced by a secondary storage subsystem.

A drive may be in any of several states relative to the controller. When in the "drive-offline" state, the drive is not operational and may not communicate with the controller via the drive control protocol. Conversely, a "drive-online" drive is dedicated to the exclusive use of a particular controller and is not available to any alternate controller.

In the "drive-unavailable" state, the drive is operating, is visible to, and may at times communicate with the controller; but the controller may not fully utilize the drive because the drive is "drive-online" to another controller.

A drive which is "drive-available" is one which is visible to, capable of communicating with, and capable of becoming (but is not currently) "drive-online" to any specific controller.

It will also be helpful to define briefly a number of generic symbols which will be used thourghout this description and in the accompanying drawings:

| Symbol | | Meaning |
|---|---|---|
| C | = | Starting cylinder |
| L | = | Starting LBN |
| R | = | Starting RBN |
| X | = | Starting XBN |
| D | = | Starting DBN |
| l | = | LBN's per track |
| r | = | RBN's per track |
| s | = | sectors per track |
| t | = | tracks per group |
| g | = | groups per cylinder |
| o | = | Group offset |
| H | = | LBN's in host area |
| Lc | = | LBN space size in cylinders |
| Xc | = | XBN space size in cylinders |
| Dc | = | DBN space size in cylinders |
| Rct | = | Size of one copy of replacement and caching table, in LBN's |
| n | = | Number of copies of tables in non-revectored spaces |
| Rs | = | Lc*g*t*r the number of replacement blocks |
| Rctpad | = | Size of per RCT copy track/cylinder alignment pad |
| Rsp | = | Replacement and caching area size (n*Rct+Rctpad*(n−1)) |

The Physical Layer

The sector is the basic addressable unit of the disk. A disk 5, as shown in FIG. 1B, is a circular platter having a coating of a ferromagnetic material on a rigid substrate. For reading information from the disk or writing information to the disk, a transducer head 6 is positioned by an actuator 7 over one of a number of concentric bands whose center lines are indicated by the numerals 8. Each "sector", such as a sector 9, is an arcuate segment of such a band, of finite extent. Every sector is written in a predetermined format which includes a header, data bytes, error detecting code and error correcting code. Each header is, in turn, a 32-bit quantity that contains the logical address of the sector. There are four copies of the header in every sector. The data bytes are application-specific information recorded on the disk by host and subsystem input/output operations. By convention there are either 512 or 576 bytes of data in every sector, when standard formats are employed. (For example, the assignee's PDP-11 and VAX-11 computer systems use a 512 byte format, while its PDP-10 and DECSYSTEM-20 computer systems use a 576 byte format.) Sector layout is described in greater detail below.

"Tracks", "groups" and "cylinders" are collections of sectors grouped into a hierarchy of categories according to access time latencies. Access time to any sector on a track is a linear function of the distance of that sector from the current sector which is under the read/write head, if on the same track. The first sector on the track immediately follows the last sector with respect to access time considerations. These properties constrain a track into the logical (but not necessarily physical) structure of a ring. Similarly, a group is described as a collection of tracks wherein the time required to switch from a sector at a given angular position on one track to a sector at the next sequential angular position on any other track is less than or equal to the time required to traverse the gap between adjacent sectors on the same track, during normal rotation.

Customarily, in a dish drive a single head-positioning actuator will be used to position multiple read/write heads which are separated from each other by a fixed distance. When instructed to read or write, a controller determines which of the heads services the addressed portion of the disk and uses that head to perform the operation.

Traversing the distance between two logically adjacent tracks in adjacent groups may involve a head switching time which exceeds the gap time. Therefore, according to this invention, in order to not lose a revolution of the disk while the switching occurs, the first sector (i.e., the sector with the lowest PBN) on all tracks on the next higher-numbered group is offset angularly from the first sector on all tracks of the next lower-numbered group on the same cylinder by a number of sectors sufficient to compensate for the head switching time.

For cylinders having more than one group, the sector with the lowest physical block number on a track in the second group of the cylinder is offset from the index mark on that track by a number of sectors representing at least the maximum switching time between the two groups (modulo the rotation time). The third group on the cylinder would be offset by twice this value, etc.

Three examples will illustrate this logical addressing structure and definition:

Assume first that a drive has four disks and seven physical oxide surfaces used for data storage. Each data recording surface has two read/write heads associated therewith; switching between one physical head and another head on the same or any other oxide surface can be accomplished during the intersector time. Other than selecting one of the fourteen heads, however, there is nothing else that can be accessed without moving the heads via a cylinder switching (seek). As a result, the drive has a logical geometry of "14 tracks, one group, 560 cylinders."

Assume next the same physical configuration as above, implemented using a servo technology which requires a settling time larger than the intersector time when a head is selected. Like the above drive, this drive would have seven physical oxide surfaces used for data storage and two heads on each surface. Switching between one head and any other head, however, would result in a head settling time greater than any intersector time, regardless of which oxide surface the head resides on. A switching of heads on such a drive would thus be accomplished via a group switching operation (group select). Other then selecting one of the fourteen data heads, however, there is nothing else that could be accessed on the current cylinder without moving the heads via a seek operation. The logical geometry of such a drive, therefore, is "1 track, 14 groups, 560 cylinders."

Third, assume semiconductor technology which provides thin-film heads capable of accommodating several read/write gaps on a single head. If the above mentioned hypothetical drive were fitted with such heads, each physical arm would have multiple gaps located on it, each selectable in the intersector time. For discussion, assume eight such gaps per arm. Inter-head changes would be accomplished via group select operations. Such a device would thus have a logical geometry of "8 tracks, 14 groups, 560 cylinders."

All three of the above logical geometries, of course, were derived from the same physical geometry.

It is possible by changing the logical organization of a disk, to change its access time characteristics. Indeed, proper redefinition of the logical addressing structure has been found to yield a possible average access time reduction of 5 to 6 percent, which is due to minimization of rotational access latencies. It is difficult to generalize as to a technique for selecting the best logical addressing arrangement for a particular drive, since there are a large number of physical parameters involved and some relate to host characteristics. So far, trial and error based on knowledgeable guesswork has proven successful. That is, a drive is exercised with a large number of read and write operations and its average access time are determined. A change in the logical structure is made (e.g., the number of groups is altered), the disk is reformatted and the drive is again exercised. This process is repeated as desired. The result is a logical format "tuned" to the physical characteristics of the host-controller-drive combination.

The Logical Layer

Attention is now directed to the logical layer of the format. At this layer, the disk is divided into four address spaces of interest, as illustrated in FIG. 1B. Two of these address spaces are in the set of sectors having an effect on the host; the other two are invisible to the host. (Specific implementations may have additional address spaces which are not visible to the host). The first address space 12 contains the set of LBN's which are visible to the host. This LBN space is subdivided into two areas: the host applications area 12A and the Replacement and Caching Table (RCT) area 12B. For a given sector size, the host applications area 12A is of constant size with respect to the number of usable blocks; that is, it is "bad block free." The RCT area 12B is not bad block free; it is protected by a multi-copy error handling mechanism described below.

The RCT address space contains a list of RBN's which are used to replace LBN's that have become unusable on devices susceptible to bad blocks. These RBN's comprise a second logical space, 14, and are the last r sectors of each track (where "r" is a drive-specific parameter) in host applications area 12A. RBN space 14 is outside the LBN space 12 presented by the controller to the host so RBN's are invisible to the host (except for the performance implications they may have on allocation policies and the size of the RCT area 12B of LBN space 12). A replacement block number is converted to a specific physical device location by a series of transformations performed by the subsystem using parameters supplied by the storage device to the subsystem. These conversions are subsystem implementation-dependent and are of no interest to the host.

The area 16 contains the XBN's which provide formatting information. It is inaccessible to the host and always is written in a predefined format (e.g., 512 bytes/sector) even if other areas (e.g., LBN space 12) may be written in other formats. The contents of area 16 are multiple copies of format control information and media error lists to use when formatting the disk in such alternative formats as may be available (e.g., 512 or 576 bytes/sector). The media error lists comprise a Format Control Table (FCT), which is a table containing information regarding blocks found to be bad at the time of manufacture.

Area 18 contains the diagnostic cylinders (DBN's). This area is inaccessible to the host and is utilized solely by diagnostics executing out of the mass storage subsystem.

The mass storage subsystem is responsible for utilizing the logical blocks and replacement blocks in a fashion presenting the host with a logically contiguous set of blocks numbered from 0 to H−1 for each unit, where H is the block capacity of the host applications area of the unit, as seen from the host. Allocated replacement blocks belong to one of two performance classifications: (1) primary replacement blocks and (2) secondary replacement blocks. Primary replacement blocks are those allocated in the simplest (and usually fastest) manner, such that a negligible amount of time (i.e., at most one rotation) is used to access them during revectoring. Secondary replacement blocks are those that are determined in a more complex fashion and normally require greater than one rotation time to access them during revectoring (i.e., a group selection or seek).

The Functional Layer

The functional layer comprises bad block handling. Two bad block handling mechanisms are used on the media. These are: (1) the use of multi-copy structures and (2) replacement and revectoring. The former protects from failure by recording multiple copies of important fields; the latter is a mechanism that replaces bad sectors with spare sectors which are reserved for that purpose. These mechanisms are used in different areas and have two fundamentally different effects.

Multi-copy structures are allocated in the RCT and FCT area to provide protection for critical data structures. Replacement/revectoring is used in the host applications area to eliminate holes in the address space.

Multi-copy structures are allocated in areas where replacement is either not possible or not desirable. An example of a multi-copy structure is the RCT described herein. In reading or writing a multi-copy structure, only one block of the logical structure may be accessed at a time. Each copy must be accessed sequentially, in ascending order. Error recovery and correction must be enabled for both read and write operations. The number of copies allocated is a device characteristic and must be chosen to ensure achievement of the error rate goals of the system. A typical value for n will be four. Each copy must be positioned on the physical medium such that a single failure will not invalidate all copies.

The Multi-Copy Read Algorithm

FIG. 2 is a listing of an exemplary computer program illustrating; the method used to read sectors protected by the multi-copy protection mechanism. It provides a procedure which detects errors and attempts to read the next copy in sequence. For this method to operate properly, error correction and recovery must be available and in use. In the Figure, the variable "target" represents the address of the sector being read in the first copy; "copy-size" is the size of a copy of the information being protected, including any pad; "n" is the number of copies; "next" is the next copy to examine; and "data-blk" is the block into which one sector's worth of data is read.

The Multi-Copy Write Algorithm

FIG. 3 illustrates the corresponding method utilized to write sectors protected by the multi-copy protection mechanism. As with the multi-copy read algorithm, copies are accessed sequentially and error recovery must be enabled. In that Figure, the variables have the following meanings: "target" refers to the address of the sector in the first copy where the information is to be written; "copy-size" is the size of a copy of the information being protected, including any pad; "n" is the number of copies; "next" is the next copy to write; "err-count" is the number of write failures; and "data-blk" is the block of data (one sector) to write.

Replacement/Revectoring Protection

Replacement is used under three circumstances to substitute spare sectors (RBN's) for sectors in the host application area (LBN's): (1) to fill holes in the logical address space left by bad blocks; (2) to reduce the risk of failure due to progressive deterioration of sectors; and (3) to improve performance in those implementations wherein the correction mechanism (if any) requires more time than the revectoring mechanism. The secondary storage subsystem determines the occurrence of the above-listed cases and initiates replacement. This is done either by notifying the host to begin host-initiated replacement or by performing subsystem-initiated replacement.

Notification to begin host-initiated replacement is done by a predetermined host protocol message packet. In the case of an unrecoverable error, the packet contains both the failure notification and the bad block notification; in the other cases, it contains only a bad block notification. If bad block replacement is host-initiated, the bad block may be replaced immediately (termed dynamic replacement) or when the file or data structure is re-allocated (termed static replacement). Dynamic replacement is made possible by the "forced error indicator", by writing the replacement block with the "forced error" modifier. If subsystem - initiated replacement is used, it is dynamic.

After a sector has been replaced, revectoring will occur upon each host access to the replaced LBN.

Replacement Strategy

In explaining bad sector replacement, certain terminology must be understood. First, if an error is said to be "recoverable" and "correctable", that implies the associated operation can be performed successfully; an operation fails if and only if an "unrecoverable" error occurs. Second, the disk going "offline" or "available" in the middle of bad block replacement is treated as an unrecoverable error; the disk must not be brought back online with the bad block replacement algorithm resuming where it left off. Instead, when the host or controller next brings the unit online, it must act on the data stored in RCT sector zero exactly as it would any other time a disk is brought online.

Bad sectors which are discovered during the media formatting process are replaced at that time. Bad blocks which are caused by wear are replaced according to the procedure detailed below in FIGS. 4A-4D. A two phase replacement scheme is utilized. First (i.e., phase 1), a block is determined to be bad. Second (ie., phase 2), the bad block is replaced.

When a specified logical block is found to be bad during an attempt to read that block, the bad block replacement process is notified of that fact. (Step 110). Alternatively, the bad block replacement process may be notified that a failure or loss of context occurred in the middle of bad block replacement; this is detected while bringing the unit online. Step 112. Either notification includes the bad block's LBN, the previous data contents of the bad block, and an indication as to whether or not the data is valid (i.e., whether the original reading of the bad block succeeded). In the case of a failure or loss of context during phase 2, the notification also includes the new RBN with which to replace the bad block, whether or not the bad block had previously been replaced, and (if it had been previously replaced) the old RBN that currently replaces the bad block.

Second, the bad block replacement process locks out all access to the bad block and all update or write access to the unit's RCT. Step 114. This is a "soft" lock—i.e., one which is implicitly released if the host or subsystem (whichever is performing the replacement) loses context. Optionally, since bad block replacement frequency should be low, it may be acceptable to lock out all access to the entire unit, rather than just the bad block and RCT.

Third, step 116, a determination is made as to what type of loss of context or failure is involved. If it is one which occurred in phase 2, then control is relinquished to step 144. If the failure or loss of context occurred during phase 1, though, the process branches to step 132. If there was no loss of context, the process continues with step 118.

Fourth (step 118), a sector-sized buffer is cleared and the current contents of the bad block are written into that buffer. (The buffer is initially cleared to account for the rare case wherein no data can be transferred.) A read operation is the performed, step 120, with error recovery and error correction capabilities enabled and evaluated as to success, step 122. The saved data is considered valid if the read succeeded, and invalid if it did not.

Next, step 124, the data obtained when the bad block was read during step 120 is recorded in the second sector (i.e., sector 1) of each RCT copy and evaluated for success. Step 126. If the data cannot be successfully recorded in the RCT, the error is reported to the error log, step 128, and process control is transferred to step 174.

Sixth, in step 130, the bad block's LBN is recorded, with an indication of whether or not the saved data is valid, together with the fact that the process is in phase 1; this information is put in sector zero of each RCT copy. This, of course, requires reading sector zero, modifying the appropriate flag (P1), then writing the updated sector zero in order to preserve other information stored in that sector. If RCT sector zero cannot be successfully read, the error is reported to the error log and control is transferred to step 174. If sector zero cannot be successfully written, the error is reported to the error log and sequence control is transferred to step 170.

Seventh, step 132, test patterns are written to and read from the suspected bad block to determine whether or not it actually is a bad block. If the test patterns fail, control is transferred to step 136 (and the block is presumed bad). If the test patterns succeed, then the process continues with step 134, under the assumption that the block may be good. The test patterns fail if either (1) the block is reported as a bad block for the second time or (2) the test patterns cannot be written and read back correctly.

In step 134, the saved data is written back to the bad block using a write-compare operation. The write-compare is performed with the "forced error" flag if and only if the saved data is invalid. If the write-compare both succeeds and the block is no longer reported as a bad block, then the original problem was a transient one and the sequence resumes at step 156. The write-compare succeeds if no error is detected and the saved data is valid, or if only a forced error is detected and the saved data is invalid.

The next step, step 136, is to scan the RCT and determine the new RBN to use to replace the bad block, whether or not the bad block has been previously replaced, and the bad block's old RBN if it has previously been replaced. The RCT is not updated at this time. If the RCT scan fails, the error is reported to the error log; step 138, and control jumps to step 166. If there is no jump, step 140 is performed next. There, the new RBN is recorded in the RCT, whether or not the bad block has previously been replaced, as well as the bad block's old RBN if it was previously replaced, and the fact that the process is in phase two (which is indicated by flag P2) (step 140); this information goes in sector zero of each RCT copy. The RCT is updated without reading sector zero, using instead the copy of RCT sector zero last read or written to the RCT. If the RCT cannot be updated, that is reported as an error to the error log (step 142) and control of the replacement process jumps to step 166.

If there is no such jump, step 144 is performed next, and the process updates the RCT to indicate that the bad block has been replaced with the new RBN and that the old RBN, if any, is unusable. If this requires updating two blocks in the RCT, then both blocks are read before either is written. If a block cannot be read successfully, that error is reported to the error log (step 146) and control jumps to step 166. If a block cannot be rewritten successfully, that also is reported as an error to the error log (step 148) and the process jumps to step 162.

In the absence of jumps or branches, step 150 is reached next. There, a "replace" command is used to alter the header of the bad black, in indicate that it has been replaced in either the primary or secondary mode, and to contain 128 copies of the replacement block's RBN address; and a write-compare command (addressed to the bad block's LBN) is used to store the saved data in the replacement block. If and only if the saved data is invalid, the write-compare is performed with the "forced error" modifier set. The replace command implicitly verifies that a header servo track failure has not occurred, which would cause a large number of improper replacements. If the replace command fails, Step 152, control branches to step 162. If the write command fails, Step 154, control branches back to step 136, to re-scan the RCT for another RBN. The current new RBN will become the old RBN for this next pass. Either failure will already have been reported to the error log. The write command succeeds if there is no error detected and the saved data is valid, or if only a forced error is detected and the saved data is invalid.

Next, in step 156, the process updates sector zero of the RCT copies to indicate that it is no longer in the middle of replacing a bad block. The RCT must be updated without reading sector zero, using instead the copy of sector zero last read from or written to the RCT. If the RCT cannot be updated, the error is reported to the error log, step 158, and control branches to step 170.

In step 160, the process releases the lock it acquired in step 114 and exits.

In step 162, the process restores the RCT to indicate that the new RBN is unallocated and usable and that the bad block is neither replaced nor has been revectored to the old RBN, whichever was it's original status. The RCT must be updated without reading any blocks from it, using instead the copies of the relevant blocks that were read from the RCT in step 144. Any errors are reported to the error log (step 164) but otherwise ignored.

Proceeding to step 166, the process uses a write command, addressed to the bad block's LBN, to restore the saved data. This write should also set the "forced error" flag if and only if the saved data is invalid. Errors are reported to the error log, step 168, but otherwise are ignored.

The process next updates sector zero of the RCT copies, step 170, to indicate that it is no longer in the middle of replacing the bad block. The RCT is updated without reading sector zero, instead using the copy of sector zero last read from or written to the RCT. Errors are reported to the error log, step 172, but otherwise are ignored.

In step 174, the process then releases the lock that it acquired in step 114. If a controller is performing the bad block replacement, it reports to the host the failed bad block replacement procedure; if a host is performing the bad block replacement, it takes whatever host-dependent action is appropriate for failed bad block replacement operation Step 176. That ends the process, and it exits.

When a disk is brought online to a host, the host or subsystem (whichever is performing bad block replacement), must do three things: (1) read sector zero of the RCT copies; (2) write the data just read back to sector zero of the RCT copies (this catches failures that occur in the middle of the multi-write routine); and (3) check the data just read to see if a failure occurred part way through bad block replacement (and, if so, resume the bad block replacement process as described above). Write access to the disk must not be allowed until after these actions have been performed and any partially completed bad block replacement has run to completion.

The foregoing algorithm guarantees that data is never lost, as the best guess to the correct data is permanently stored before any action is taken that might destroy the data. There is a failure mode, however, in host-initiated replacement, which assumes that the system crashes in the middle of bad block replacement. The bad block that has been partially replaced may be in the middle of the system core image or some other portion of the disk critical to booting the host system. This failure mode is eliminated if the subsystem, rather than the host, performs bad block replacement.

The Replacement and Caching Tables

The replacement and caching tables maintain a record of the locations of all revectored LBN sectors and the status of each RBN on the unit. Each RCT entry represents an RBN. In turn, each copy of the table has entries organized in ascending RBN order, with an entry for each RBN sector on the unit. There are "n" copies of the table on the unit, where "n" is a device characteristic. The tables are stored at the high address end of the LBN area of the unit. Table entries and RBN's are allocated via a "hash" algorithm described elsewhere in this document.

Figure 5:
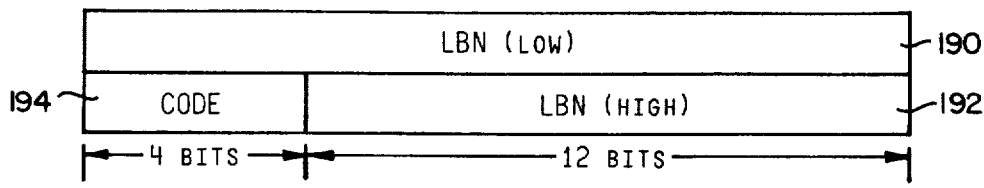
FIG. 5 is a diagrammatic illustration of the format of a replacement block descriptor.

A plurality of copies of the RCT are stored in the highest addresses of the LBN space. Each sector of the RCT contains 128 entries, regardless of whether the disk is formatted as 512 or 576 bytes/sector. Each copy of the RCT is stored on an integral number of tracks. "Null entry" positions are added to adjust the RCT's size so that it meets this requirement. These null entries do not correspond to RBN's; there is always at least one null entry at the end of the RCT. FIG. 5 illustrates the format of a replacement block descriptor. There, 190 represents the lower order portion of a revectored LBN's logical block number and 192 represents its higher order portion. A four-bit segment 194 is placed contiguous to that address. It is written with an octal status code. Suitable exemplary codes and their meanings are listed below:

| Code | Meaning |
| --- | --- |
| 00 | unallocated (i.e., empty) replacement block |
| 02 | allocated replacement block-primary RBN |
| 03 | allocated replacement block-non-primary RBN |
| 04 | unusable replacement block |
| 10 | null entry |

Additionally, the size of the copies must be adjusted so that corresponding blocks of each copy are, to the maximum extent possible, accessed using physically distinct components. For conventionally structured devices, this implies: (1) if the number of copies is less than or equal to the number of read/write heads, then corresponding blocks of each copy are accessed by different heads; (2) if the number of copies is greater than the number of heads, then corresponding blocks of each copy are distributed as evenly as possible across all heads; (3) if a device uses a servo surface, then corresponding blocks of each copy are located using different tracks of the servo surface; and (4) the RCT copies are allocated such that the last sector of the last copy occupies the last LBN on the unit. The last copy of the RCT is padded so that its size is an exact multiple of the device's track size. Allocation of the RCT is then performed starting at the highest LBN and working downward. The RCT pad area is controller-specific and is not accessed by the host.

The first sector in the RCT contains information about the state of any replacement operation which may be in progress. A copy of the volume serial number is also contained in this sector to allow validation of the RCT by diagnostics routines.

The second sector in each copy of the RCT, sector 1, is used by the bad block replacement algorithm, as stated above. This sector is used to hold a copy of the data from the sector being replaced.

Figure 6:
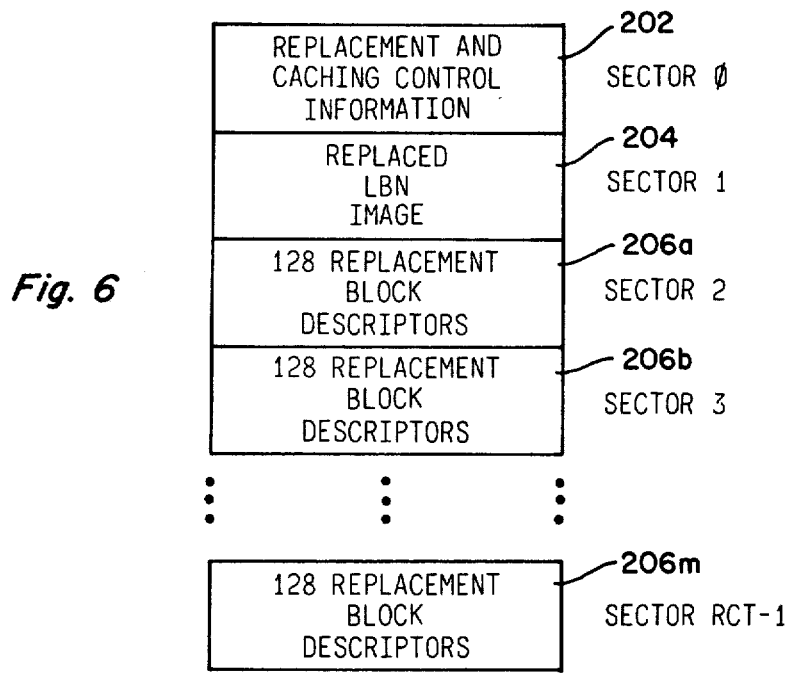
FIG. 6 is a diagrammatic illustration of the structure of the replacement and caching table (RCT) of the present invention.

FIG. 6 illustrates the resulting RCT structure. The first sector 202 of the RCT (i.e., the so-called sector 0) contains replacement and caching table information. The second sector, 204, (i.e., the so-called sector 1) contains the replaced LBN image. Sectors 206a-206m (i.e., the so-called sectors 2 thru RCT-1) correspond to the 128 replacement block descriptors.

Figure 7A:
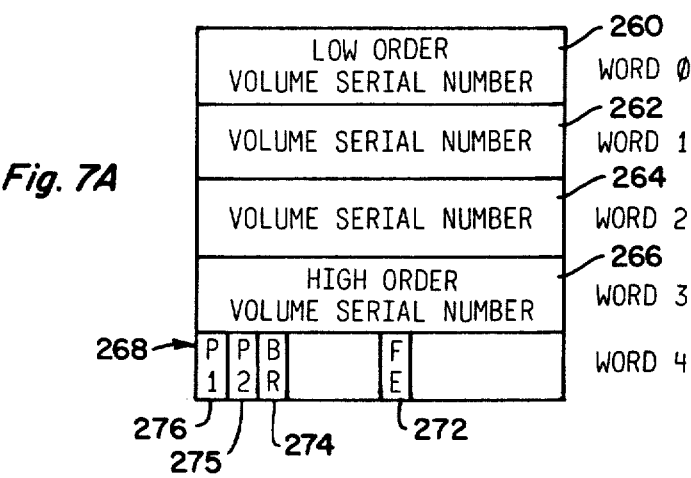

And the contents of sector zero of the RCT are illustrated in FIGS. 7A and 7B. As shown there, the sector comprises 512 bytes. Words 260-266 contain the volume identification assigned during the formatting process. Word 268 contains four bits having individual significance. Bit 272 is the forced error (FE) flag indicating that the replacement process should write the forced error indicator in the target RBN; as explained elsewhere herein, "setting" the forced error indication means writing the sector with the code for the forced error indicator, which in the example illustrated is the one's complement of the error detecting code for the sector. Bit 274 is a flag (BR) for bad RBN's, indicating that the replacement in progress was caused by a bad RBN; it is cleared after the replacement process is over. Bits 275 and 276 are flags (P2 and P1, respectively), indicating whether a replacement is in progress and, if so, its phase. Words 278-282 hold a copy of the LBN of the block being replaced, if a replacement is in progress; this field is only valid when the P2 bit 274 is set (i.e., when in phase 2 of replacement). Words 284, 286 contain a copy of the RBN of the block with which the LBN is being replaced, if a replacement is in progress; they, too, require that the RP flag be set. The RBN of the bad replacement block appears in words 288, 290 if the BR flag 274 is set.

The RCT replacement allocation algorithm is one which is used to allocate an RBN to replace a bad LBN. Described below are the search algorithm and various support algorithms.

RCT Search

The search begins at the descriptor for the primary replacement block. If the desired LBN address is not stored there and the descriptor is not empty, then a ping pong search begins of the sector containing the primary replacement block descriptor. If either the desired LBN address or an empty descriptor is not encountered, then a linear scan of the remaining RCT blocks, and descriptors within blocks (with wrap-around at the end of the RCT), ensues until one of two things occurs: (1) an unallocated replacement block descriptor is encountered in an overflow location (a secondary) or (2) the entire RCT is searched without success (a failure).

The search operates at two levels. First, within the primary descriptor RCT sector, the search proceeds outward from the primary descriptor searched, starting with the next highest RBN descriptor. This degenerates to a linear search once the first or last descriptor is encountered. The linear search starts with the next highest RCT sector address, once the initial sector has been completely searched. Each new sector is searched in a linear fashion starting at the lowest RBN descriptor and scanning until the highest RBN descriptor in the sector is encountered. If at any time during the linear search a null (not an empty) entry is encountered, the search resumes at the first entry in the third RCT sector (the first with descriptors). The search is terminated when it is certain that all the RCT entries have been searched.

Figure 8:
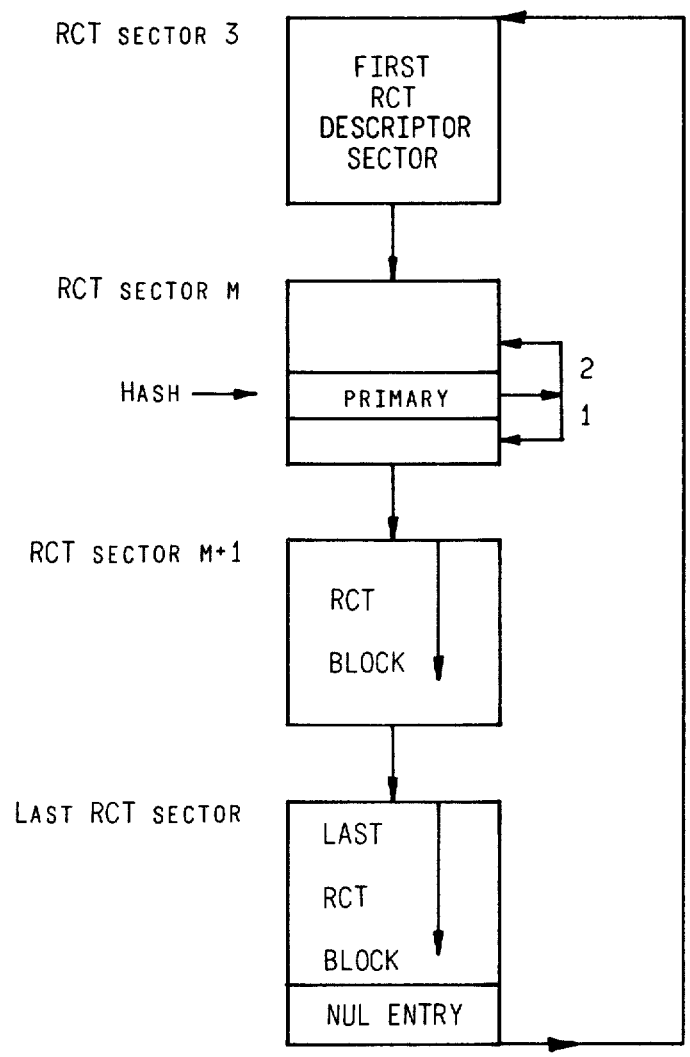
FIG. 8 is a diagrammatic illustration of the RCT search algorithm of the present invention.

FIG. 8 illustrates the RCT search algorithm. A listing of a sample coding for the algorithm is shown in FIGS. 9A-9C.

The Primary RCT Hash Algorithm

The primary RCT has algorithm is one which takes as input and LBN and produces a host LBN address of the RCT block containing the primary RBN descriptor that corresponds to the previously revectored LBN. An offset pointing to the primary RBN descriptor within the RCT block is also produced. This algorithm always produces a block number within the first copy of the RCT within the replacement control area. The algorithm is illustrated in FIG. 10.

Detailed Description of an Embodiment of the Physical Layer

With the foregoing generalized description in mind, it will now be helpful to provide some further details of an exemplary implementation.

Figure 11:
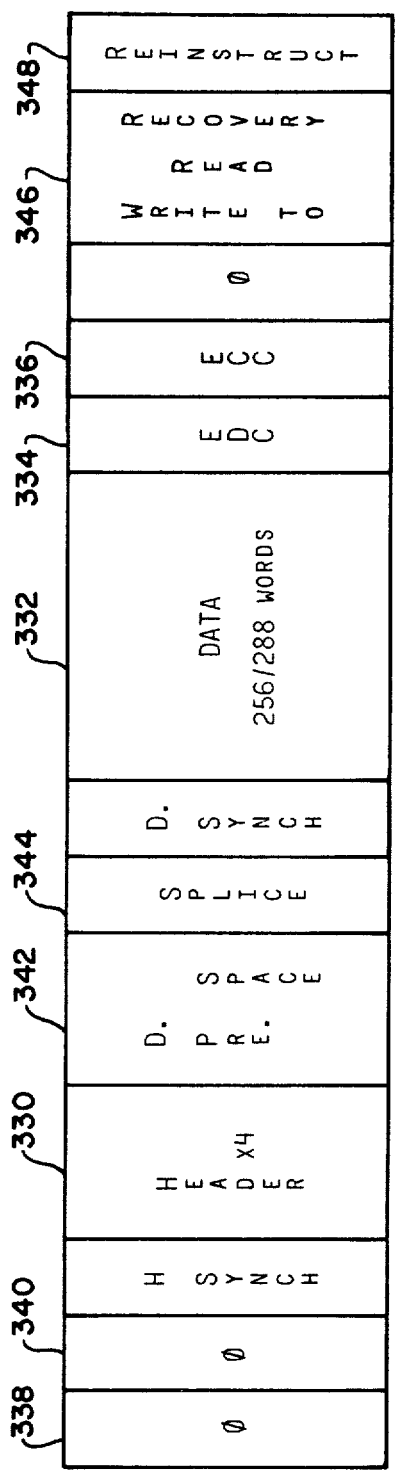
FIG. 11 is a diagrammatic illustration of the sector format employed by the present invention.

Referring now to FIG. 11, a suitable sector format is shown there, illustrating the various sector fields: header 330, data 332, error detecting code (EDC) 334 and error correcting code (ECC) 336. Four copies of the logical address are provided within the header. The EDC in field 334 provides error detection coverage from the entry of the data into the subsystem until its exit from the subsystem. It is also used in the illustrated embodiment to generate the "forced error indicator." Sixteen bits are used for the error detecting code in the present example, although codes of other lengths can be employed, of course. The ECC in field 336 provides the primary detection and correction mechanism against medium and device transmission errors. (An exemplary ECC occupies 170 bits and is described in commonly assigned patent application Ser. No. 277,060, filed June 24, 1981, by Charles M. Riggle et al, and titled Multiple Error Detecting and Correcting System Employing Reed-Solomon Codes, which is incorporated by reference herein for the purpose of describing the error correcting code and its use).

The header preamble "spacer" field 338 is an area padded with zeroes and used to accommodate the maximum uncertainty between a drive's negation of sector pulse and a controller's notice of the change, plus the controller quantization error in preamble length.

The header preamble field 340, also zeroes, is the number of words necessary to allow the drive's phase-locking oscillator (PLO) to settle before the occurrence of header sync. The "header preamble length" field is provided to the controller by the drive in response to a designated command.

Generation and Use of the Forced Error Indicator

The controller 4 transmits to the drive 3 the information for each sector, to be written in the format of FIG. 11. Generally, the error detecting code and error correcting code are computed and are inserted in the appropriate fields of the sector format by the controller 4, though in some cases the host or the drive itself might supply some of such information. Similarly, when reading from the disk drive 3, the controller 4 generally performs the functions of checking the error detecting code and error correcting code, though it is also possible for the host or drive to do so in some systems.

Figure 13B:
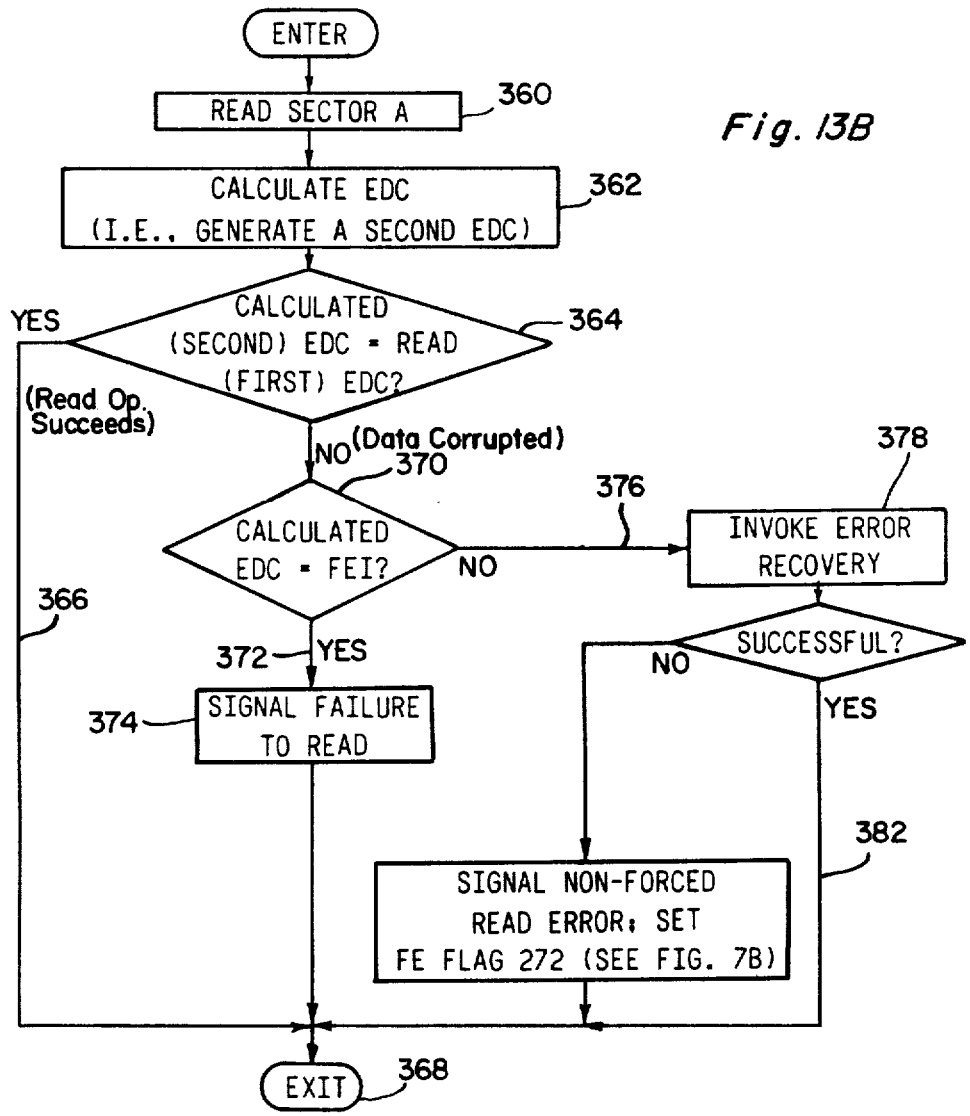
FIG. 13B is an exemplary flow chart for operating the controller 4 of FIG. 1A in accordance with this invention to utilize a so-called forced error indicator when a sector is read from a disk.

The procedure by which the controller (or host or drive, as appropriate) gernerates and utilizes the error detecting code field 334 for forced error indication is illustrated in FIG. 13B. There, a flow chart is provided illustrative of the operation of a processor for reading from the recording medium. With reference now to that figure, a sector "A" is to be read. Under command from the controller, the disk drive positions a head appropriately so as to "read" and provide to the controller the information stored in sector A. (Step 360). From the data field of the sector, an error detecting code (EDC) is computed. (Step 362). The error detecting code calculated in step 362 is then compared with the error detecting code contained in field 334 of the information read from sector A in step 360. (Step 364). If the calculated EDC matches the EDC read from the recording medium, then the read operation is successful and processing proceeds along the branch 366 to exit point 368. However, if the two EDC values do not match, some further processing is required to determine the reason for the mismatch and to decide on further steps to take. Thus, the controller next looks to see whether the forced error indicator was present (or "set") in sector A as recorded; this is done by comparing the calculated EDC with the one's complement of the EDC read from field 334. (step 370). If the two match, that means the forced error indicator was detected, in which case processing continues along branch 372; the controller then knows that the data in the sector already was corrupted when it was written and therefore cannot be recovered through the read operation. Thus, the read operation fails; and in doing so, a specific code or signal is generated in step 374 to notify the host that the read operation failed due to detection of the forced error indicator. On the other hand, if the forced error indicator was not detected in step 370, it is possible that error recovery technique might successfully be employed, so control is transferred along branch 376 to step 378. In step 378, the available error recovery techniques are invoked and an attempt is made to reconstruct the data written to sector A. If error recovery is successful, then the read operation has succeeded and, analogously to a successful outcome from step 364, control proceeds along branch 382 to exit point 368. However, if error recovery does not succeed, then an error code is generated to indicated to the host that the read operation failed due to the medium inaccurately storing the information. Step 384. This latter error code is different from the error code generated in step 374, to distinguish between read errors due to defective media and read errors due to the forced error indicator.

It is important to distinguish between forced errors and non-forced errors in reading because they are handled differently when copying information from one sector or group of sectors on to another sector or group of sectors. When a forced error indicator has been set in a sector, the underlying medium is still presumably in satisfactory condition; thus, new information can be written into that sector, at which point the forced error indicator is cleared. However, if the information in a sector is unrecoverably corrupted but the forced error indicator is not present, it is likely that the medium underlying sector is defective and that any futher writing onto that medium would result in a further loss of information.

There are thus three types of situations to deal with when copying a sector from a first volume of memory into a second volume of memory. If the sector was successfully read from the first volume of memory, it may of course be written intact into the second volume of memory. If the sector could not be successfully read because it was logically corrupted and unrecoverable, then the contents of that sector can either be discarded entirely or can be written into a sector in the second volume with the forced error indicator set to signify that the data was corrupted when recorded. Rerecording of that sector subsequently results in the clearing of the forced error indicator. Thus the organization of a particular file can be retained with the position in the file being held open and identified as not being defective though containing incorrect data.

Figure 13C:
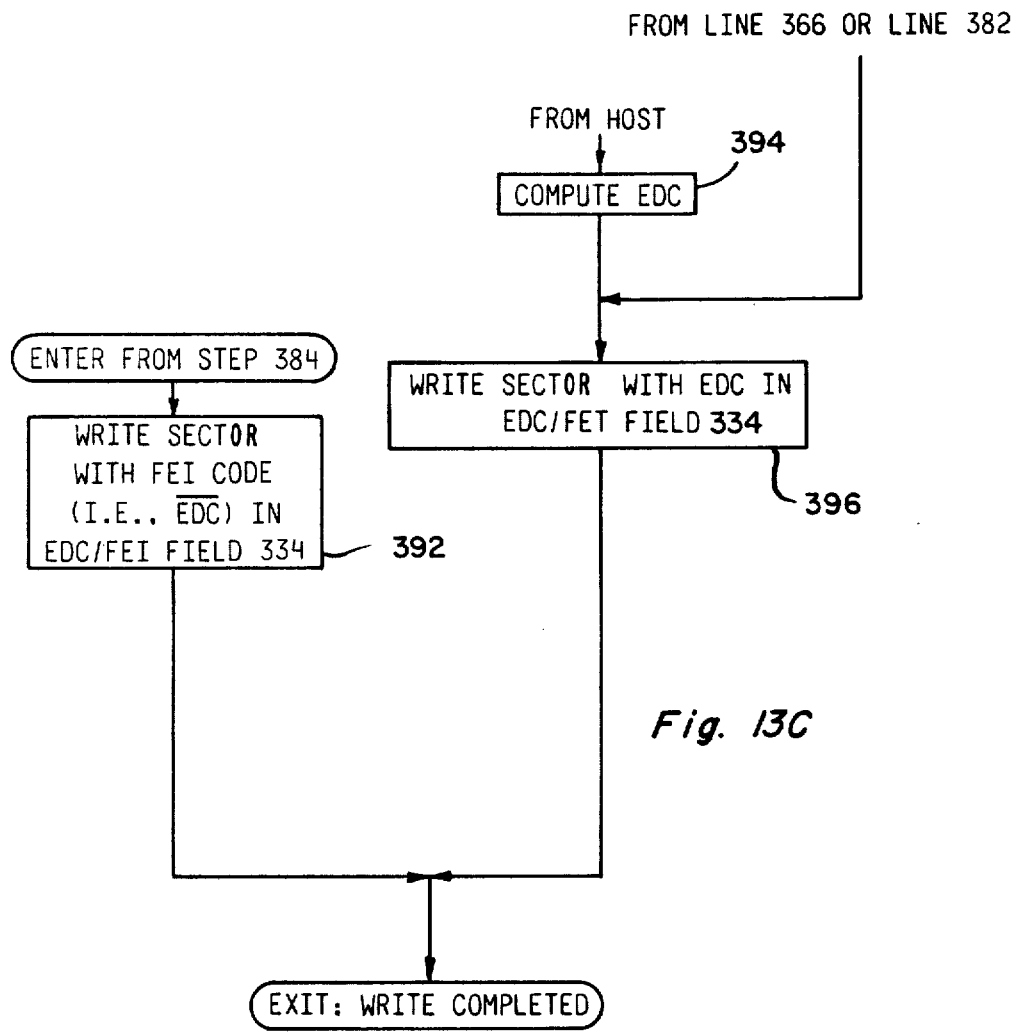
FIG. 13C is an exemplary flow chart for operating the controller 4 of FIG. 1A in accordance with this invention to utilize (or not utilize, as appropriate) the forced error indicator.

This is illustrated in FIG. 13C, which shows the two possibilities for writing into the EDC/FEI field 334 of a sector. If a sector is to be written with information read from a disk file, and in the reading process of FIG. 13B, step 384 has been reached (signifying that the data read is corrupted and the forced error indicator code is not present for the sector which was read), then the data known to be corrupted is to be written to a good block of recording medium on the same or another disk surface and the forced error indicator code is to be set when the new sector is written. This is indicated by going or branching from step 384 directly to a step 392, where the write operation occurs with the forced error indication code set in field 334. A contrast, when the sector is to be written with new data from a host (which data is presumed to be reliable and uncorrupted) or with data successfully read from storage, as indicated by the "yes" branches from steps 364 or 380, then the write operation occurs with an appropriate non-complemented error detection code written to the EDC/FEI field. (Step 394).

The data preamble "space" field 342 is the area necessary to accommodate controller quantization errors in the transition between reading headers and writing data preamble. The length of splice field 344 is the number of words necessary to accommodate worst-case header transmission delays, header compare time, write splice area and PLO lock time. The number for this area (in words) is placed in the "data preamble length" field of the response to the above-designated command.

The length of the write-to-read recovery field 346 is the number of bits necessary for write recovery, plus an allowance for uncertainty.

The length of the reinstruct time field 348 is the disk area traversed during the time the controller is cleaning up the current sector transfer and sending the command to the next one.

The Headers

Figures 12, 13A:
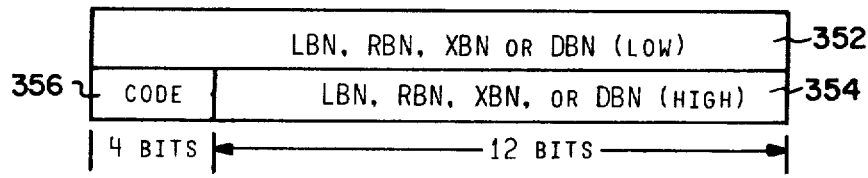
FIG. 12 is a diagrammatic illustration of one-fourth of the sector header of the sector format of FIG. 11.
FIG. 13A is an exemplary listing of a routine for generating an error detecting code usable in the present invention.

The sector header is 128 bits: thirty-two bits replicated four times. The layout of one of the thirty-two bit copies is shown in FIG. 12. A 16-bit word 352 and the lower 12 bits of the next word 354 form a 28-bit block number field, which is followed by a 4-bit header code 356. The block number field represents an LBN, an RBN, an XBN, or a DBN, depending on the header code. The block number field provides enough addressing for approximately 0.25 giga-sectors or 1 terabit of data.

The octal header code may, for example, be interpreted as follows. First, an exemplary code such as 00 (octal) may indicate a usable logical sector wherein data may or may not be valid, depending upon the validity of the EDC. The block number in the header represents the LBN for this block. This header code may appear in LBN space only. Another code, such as 03, may indicate an unusable revectored logical sector. This header code may appear in the non-RCT portion of LBN space only. The data field contains the RBN header field of the replacement block, replicated 128 times; the block number in the header represents the LBN for this block.

Yet another code, such as 05, may indicate an unusable primary revectored logical sector. Such a sector has been revectored onto the first replacement sector on the track. The data field contains the RBN header field of the replacement block, replicated 128 times. The block number in the header represents the LBN for this block. This LBN has been revectored to its primary RBN. This header field may be registered in the non-RCT portion of LBN space only.

Yet another code, such as 06, may be used to indicate a usable replacement sector, wherein data may or may not be valid, depending on the validity of the EDC. The block number in the header represents the RBN for this block. This header code may appear in RBN space only.

Another code, such as 11, may signify an unusable sector, where data is invalid. The block number in the header is that of the sector's type if it had been a usable sector. This header code may appear in RBN, XBN, or DBN space, the RCT area of LBN space, and in LBN's which have been secondary revectored due to header errors.

Yet another code, such as 12, may signify a usable external sector, wherein data may or may not be valid depending upon the value of the EDC. The block number in the header represents the XBN for this block. This header code may appear in XBN space only. A further code, such as 14, may represent a usable diagnostic sector. The block number in the header represents the DBN for this block. This header code may appear in DBN space only.

Header Compare Algorithm

A header compare algorithm is used by the controller for locating a designated sector. First, the controller determines the address of the sector it is searching for on the disk (i.e., the "target" address). The controller then reads the four copies of the 32-bit header of the sector that may be at the target address. These headers are broken into two 16 bit fields (low and high). If any two of the four low fields, as retrieved from the disk, match the low field of the target address and any two of the four high fields, as retrieved from the disk, match the high field of the target address, then the header compare succeeds. If at least two low matches are not found, then a header match is not possible.

If at least two low matches are found and two high matches are not found, then it is possible that the correct sector was located but the header code did not match the target header code. This is possible if an LBN has been replaced, or if a bad block has been found in a multi-copy protected area (i.e., RCT, XBN or DBN). The controller alters the header code in the target address then determines if two high matches now exist. A variant of the header compare algorithm is also used to conclude that a drive has mis-seeked or seeked to the wrong cylinder or group, or that an incorrect head has been selected. For this purpose, any three of the four high header words must match and any three of the four low header words must match, since there is not an expected header value to match against. Given this three-way match, the controller may interpret the header code and block number fields to determine the actual cylinder, group and track that have been accessed, for comparison against the correct values.

The Data

The contents of the data field are application-dependent. The data field size will depend on the format used by the host processor. For the assignee's products, there are two basic data field sizes, 512 bytes and 576 bytes. A portion of all disks is always formatted with 512 byte data fields. This is the manufacturing defect area (XBN). The other areas on disk drives attached to those controllers that support both sector sizes may be formatted in either 512 or 576 byte format. Each time a device comes "online" to a controller, the controller is responsible for determining the sector size employed by the device according to the algorithm described below. First, the device is instructed to change the sector size of its reading operation to 512 bytes. The starting sector of the first copy of format information is read. The first word of this sector is tested. If it is equal to a preselected number, then LBN/RBN space is written in 512 byte mode. On the other hand, if it is written with some other preselected number, then such space is written in 576 byte mode. If the starting XBN of the first copy is not readable or a value other than the aforementioned preselected values is in the first word, then the starting XBN of the next copy of the format control table is computed using the following formula:

next copy XBN=old copy XBN+size of format control table.

This new sector is then read. If it has an uncorrectable I/O error, then the next copy is accessed, until all copies are tried. If all copies are read and there is no copy that can be read without an uncorrectable I/O error, then a media format error is returned to the host. Also, if the first sector (i.e., XBN) of the first copy read without an uncorrectable error contains an invalid media mode code, then a media format error is returned to the host.

(The host may force the device into a specific mode, in which case the controller will attempt to access the device unit using that mode, without issuing the media format error. This is intended only as a means of data recovery, and not as a standard operating practice.)

If the volume is in 512 byte format, the algorithm is complete. If in 576 byte format, the controller is responsible for prefacing all operations on XBN's or 512 byte DBN's with a command to change the size to 512 bytes, and preceeding the next reference to LBN's or RBN's with a command to change the size back to 576 byte format. In other words, the controller is responsible for changing the sector size dynamically based on which space the sector falls in, using 512 byte format for XBN's and DBN's but 576 byte format for LBN's and RBN's.

The EDC

The Error Detecting Code (EDC) is a 16-bit code used to detect errors caused by internal problems in the controller. It is applied as an end-to-end verification of correct controller operation. The algorithm shown here was designed to detect column errors as well as multi-bit parity errors.

The EDC is computed via an exclusive-OR operation and left circular shift algorithm, using a non-zero initial value and 16 bit word size. The rotate used in this algorithm has no carry. The algorithm itself is listed in FIG. 13A. In addition to detecting errors, the EDC also is used herein to provide a forced error indicator. This is accomplished by storing the one's complement of the correct EDC in the EDC field of the sector. An "error" is thereby indicated when the sector is read; this "error" is eliminated when the sector is next written with correct EDC. This technique makes it very easy for diagnostic routines to identify sectors having forced errors. That is, when an EDC indicates an error, it is a simple matter to determine whether that EDC is in fact the one's complement of the EDC to be expected on the basis of the recorded data.

The Track

A track is composed of sectors and timing marks. There must be at least two sectors per track (1 LBN sector and 1 RBN sector). Timing marks are of two types: (1) sector marks and (2) index marks. A sector mark precedes each sector and may be used by the controller for rotational optimization purposes. An index mark precedes the first sector on each track within the first group in the cylinder and precedes a sector at the same angular position with respect to the first group on all other tracks within all other groups in a cylinder.

Detailed Description of an Embodiment of The Logical Layer

Address Spaces

There are four address spaces in the set of sectors made available to the controller by the drive. The first address space contains the set of logical blocks which are visible to the host. This LBN space is divided into two regions: the host accessible area and the RCT's. The second address space contains replacement blocks which are used to replace logical blocks that have become unusable. These RBN's are invisible to the host except for the implications they have on allocation policies. The controller utilizes the logical blocks and replacement blocks in a fashion that presents to the host a logically contiguous set of blocks numbered from zero to $H-1$, where H is the block capacity as seen from the host. The third address space is the extended block space; (XBN's); this is a set of blocks visible only to the controller, which is used to store manufacturing format control information and transient controller-specific information. Finally, there is the diagnostic block space (DBN's) containing blocks devoted to controller-resident diagnostics. The DBN's are also visible only to the controller. These address spaces are differentiated by unique header codes, preventing inadvertent access to or operation in the wrong type of sector.

Although conformation to the overall geometry described herein is a requirement of the invention, the specific capacities and other physical parameters associated with the geometry of the disk will vary from device type to device type. These specific parameters are part of the permanent characteristics of each device type, and are determined when the device is designed. The controller shields from the host these parameter-dependent device properties. The controller issues a generic command termed the GET CHARACTERISTICS command, in response to which the drive responds by sending to the controller the parameters necessary for use in geometry-related operations. The controller then uses those parameters as appropriate and necessary.

The Drive Characteristics Blocks

Figure 14:
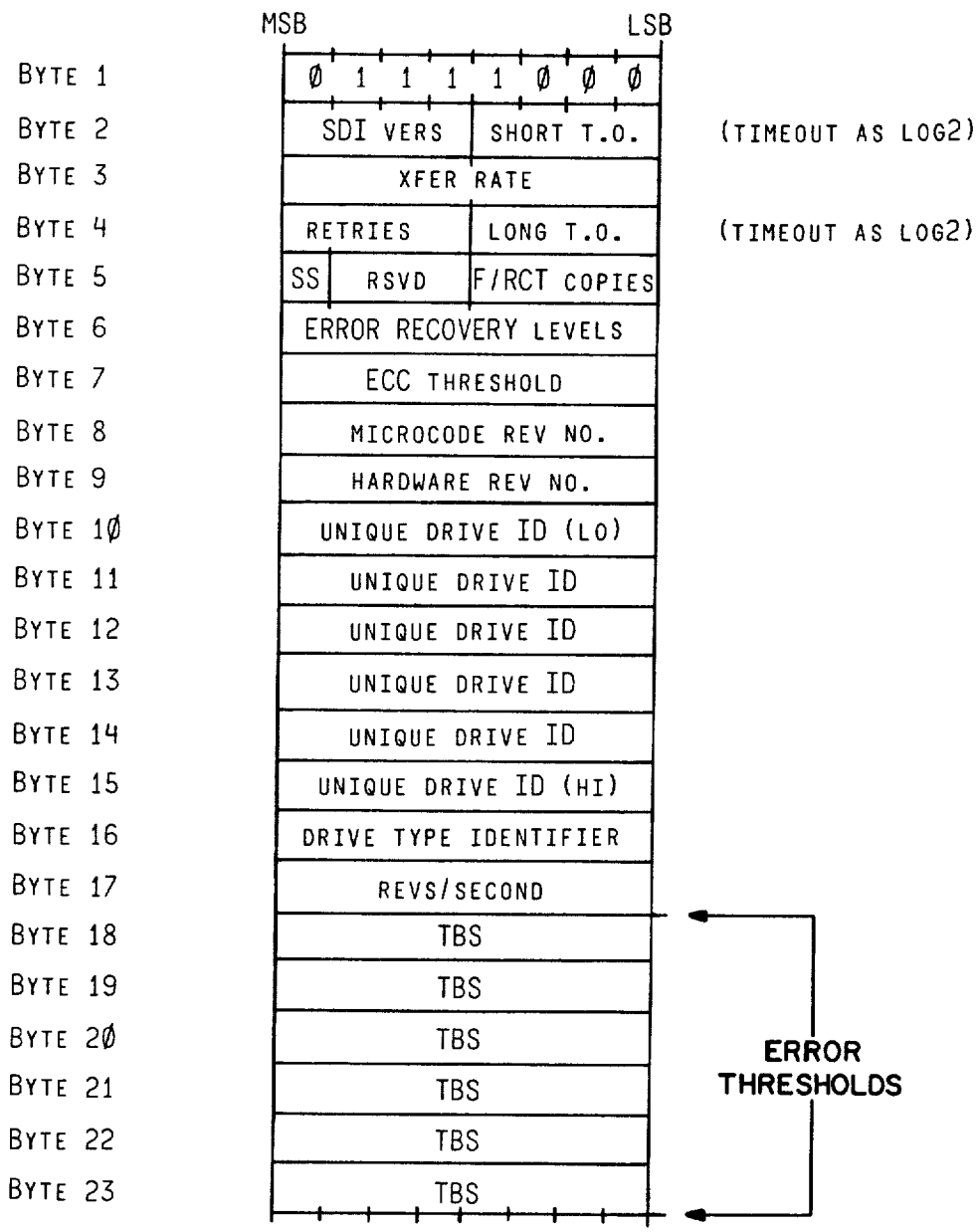
FIG. 14 is a diagrammatic illustration of a response from drive to controller, providing certain drive characteristics.

As mentioned above, in a secondary storage subsystem according to this invention, a disk drive provides to the controller, responsive to a command, one or more messages containing various parametric information. In this regard, it should be noted that within a drive there may be one or more subunits, each of which can be addressed independently by the host and controller. Thus, to fully characterize the drive, two commands are used. First, a command named the GET COMMON CHARACTERISTICS command is employed to evoke a message regarding parameters which are common to all subunits of the drive. Next, a comand named the GET SUBUNIT CHARACTERISTICS command is used to evoke the characteristics of specific subunits of a drive. The format of the response to the GET COMMON CHARACTERISTICS command is illustrated in FIG. 14. There, a 23 byte sequence is shown. The first byte identifies the nature of the response. The lower half of the second byte conveys the length of a short time out, expressed as power of two. The upper half of the second byte contains a number indicating in the version of the bus used between the controller and drive. In the third byte, the drives bit transfer rate is specified, scaled down by a factor of 100,000. The fourth byte, like the second byte, is broken in half. Its lower half includes a long time out, also expressed as a power of two; while its upper half conveys the number of retries of a failed operation which will be required by the drive. In the lower half of the fifth byte, a number is written to indicate the number of FCT and RCT copies maintained. The most significant bit in the fifth byte, SS, indicates the drive sector size. The sixth byte specifies the number of error recovery levels which the drive makes available. It is a characteristic of this system that the controller need not be aware of the error recovery techniques available in the drive. The drive may employ several different error recovery techniques, numbered in their order of increasing or decreasing chance of success. Assume, for example, that by convention error recovery Level 1 corresponds to the technique having the greatest probability of success; error recovery Level 2 is the next most likely to succeed, etc. Then, the controller need only signal for the invocation of error recovery Level 1 and the subsequent error recovery techniques, in ascending numerical order (corresponding to descending probability of success). The drive, responsive to seeing each of the error recovery level indicators, invokes the appropriate recovery method.

The seventh byte contains the ECC threshold, above which replacement and revectoring are invoked. The eighth byte contains an indication of the microcode revision number of the drive and the ninth byte contains an indication of its hardware revision number.

Bytes 10–15 contain a unique drive identification number or serial number. The sixteenth byte contains a drive type identifier and byte seventeen indicates the rotational speed of the disk platters, in revolutions per second.

Bytes 18–23 contain various error thresholds.

Figure 15A:
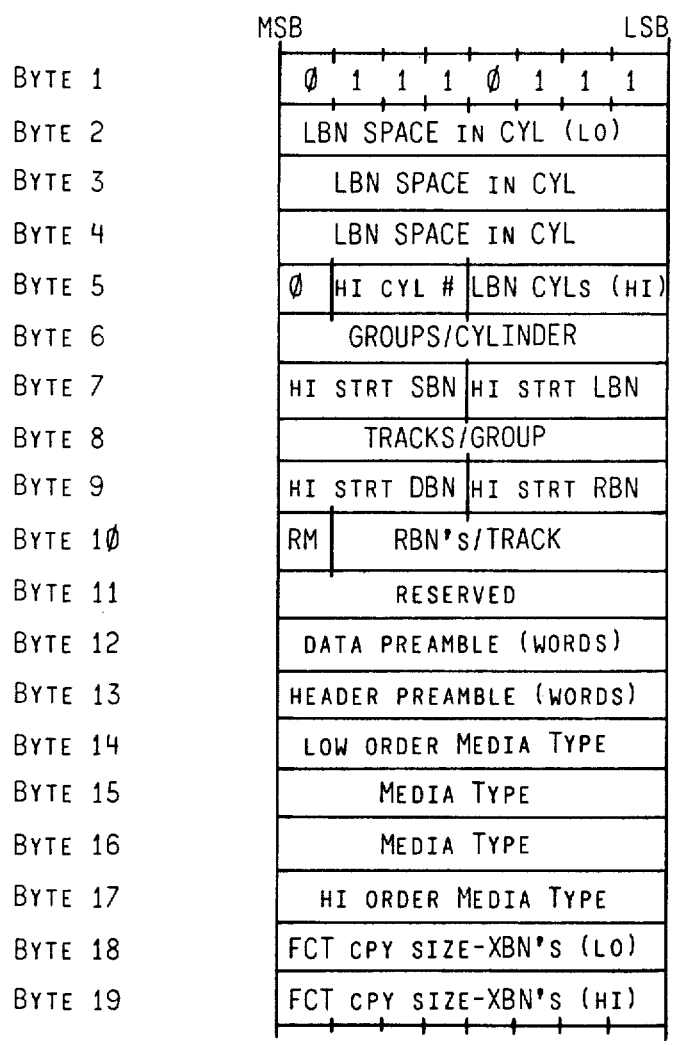
FIGS. 15A and 15B, together, are a diagrammatic illustration of a response providing certain other characteristics for a designated drive subunit.
Figure 15B:
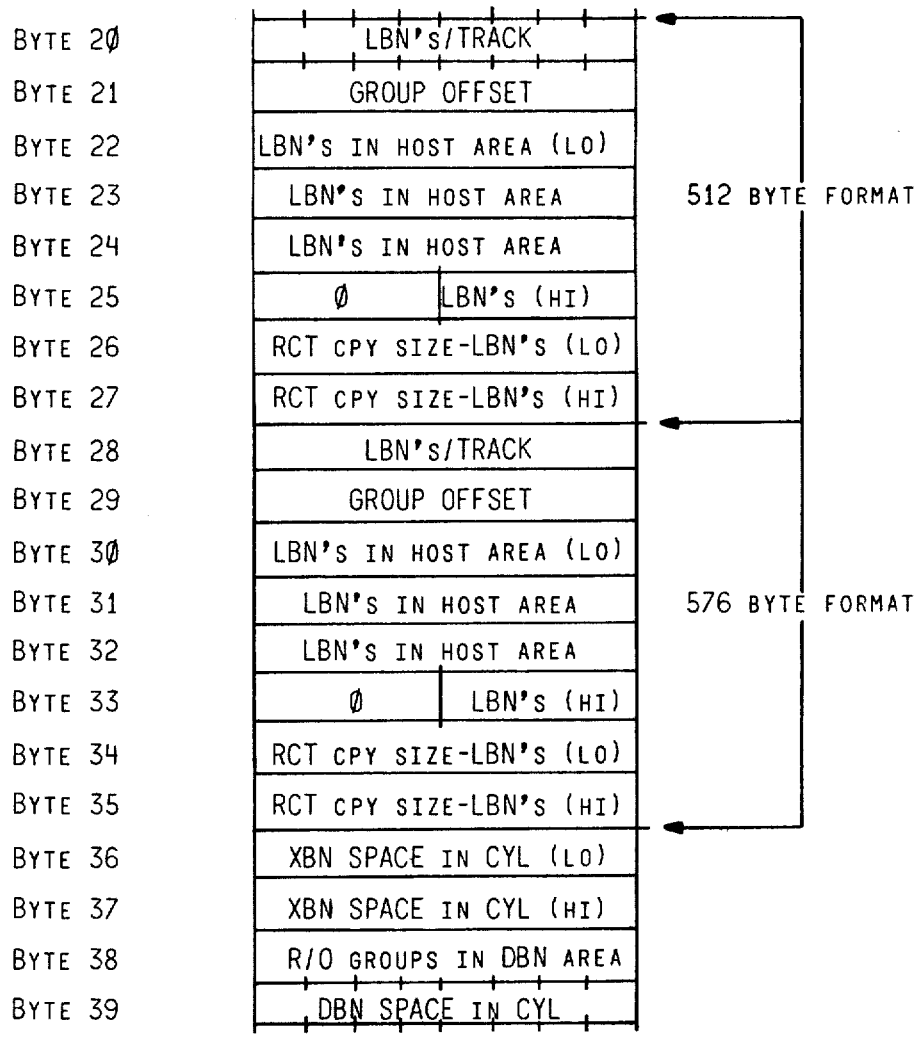

The response to the GET SUBUNIT CHARACTERISTICS command is indicated in FIGS. 15A and 15B. As shown there, the response is 39 bytes in length. The first byte contains a pattern indicating the nature of the response. Bytes 2, 3, 4 and the lower-order half of byte 5 contain the number of cylinders in the LBN space. The field comprising bits 6–4 of byte 5 contains bits number 30–28 of all cylinder numbers on this subunit.

The number of groups per cylinder is indicated in byte 6.

The lower-order half of byte 7 contains bits 27–24 of the first LBN on this subunit, while the upper-order half of that byte contains the same bits of the first XBN on this subunit. Byte 8 contains the number of tracks per group. Byte 9 is fragmented into two halves, the lower half of which contains the bits 27–24 of the first RBN on this subunit, while the upper half of the byte contains the same bits for the first DBN on this subunit.

The number of RBN's per track is indicated on byte 10. Bytes 12 and 13 contain the length of the data and header preambles, respectively, in words.

Bytes 14–17 record the media type. Bytes 18 and 19 give the size of copy of the FCT, in XBN's.

Bytes 20–27 are used for the 512 byte format, and their counterpart for the 576 byte format is bytes 28–35. As labelled in the drawing, the contents of the bytes should be self-explanatory. Bytes 20 and 28 indicate the number of LBN's per track. Bytes 21 and 29 indicate the group offset—i.e., the offset from one group to another to permit spiral read operation. The number of LBN's in the host area is indicated from byte 22 through the lower-half of byte 25 and from byte 30 to the lower-half of byte 33. Bytes 20–23 and 34–35 indicate the size of a copy of the RCT, in LBN's.

Bytes 36–39 are common to both formats. Bytes 36 and 37 indicate the size of the XBN space, in cylinders. Byte 38 indicates the number of groups in the DBN area and byte 39 indicates the size of the DBN space in cylinders.

The replacement sectors in any given drive are logically numbered from 0 to (Rs−1), where $Rs = Lc*g*t*r$ is the total number of replacement sectors. A replacement block number is converted to a specific physical disk location through a series of transformations performed by the controller using parameters supplied by the drive. These transformations are described later. The last r sectors (where r is a drive-specific parameter) of each track in the host application area is reserved for replacement blocks for revectored bad blocks. These alternate blocks lie outside of the LBN space presented by the controller to the host, and are accommodated in the logical-to-physical address conversion algorithm described below.

Figure 16:
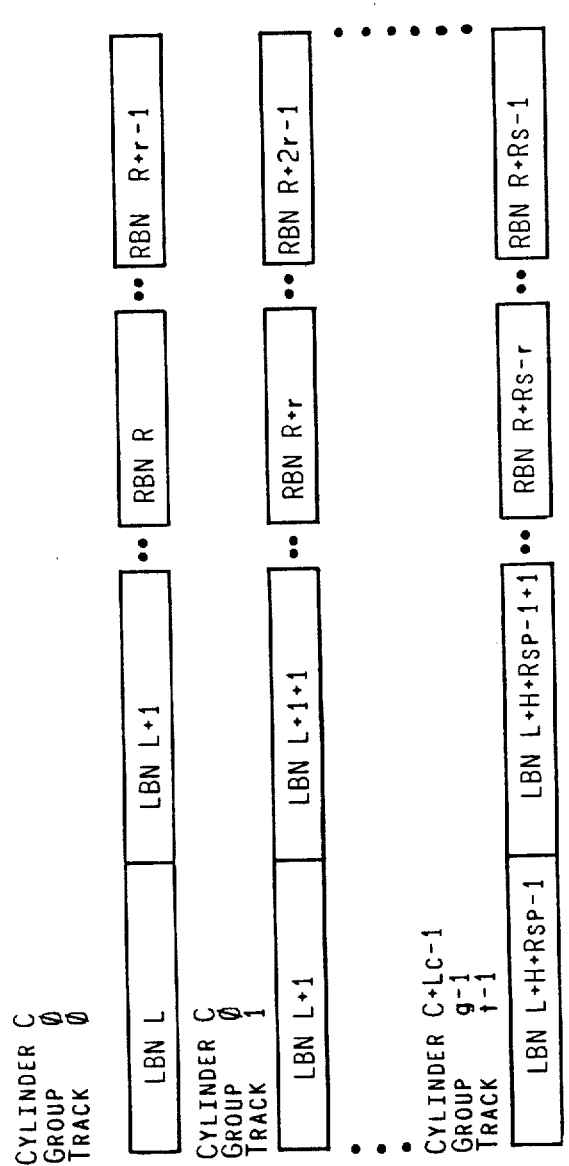
FIG. 16 is a diagrammatic illustration of the first two and the last tracks of the LBN/RBN space of a drive.

FIG. 16 illustrates the first two and last tracks in the LBN/RBN space of a subunit.

External Block Track Geometry

The external sectors on any given drive are logically numbered from (0 to Xtot−1), where $Xtot = Xc*g*t*s$ and is the total number of external sectors.

The transformation for converting an external block number to a specific physical disk location is explained later.

XBN's are allocated contiguously on all XBN cylinders; they increase incrementally from the starting XBN number as the sector number, track number, and cylinder number increase, until the XBN cylinders are exhausted. There are no replacement blocks on XBN cylinders.

Figure 17:
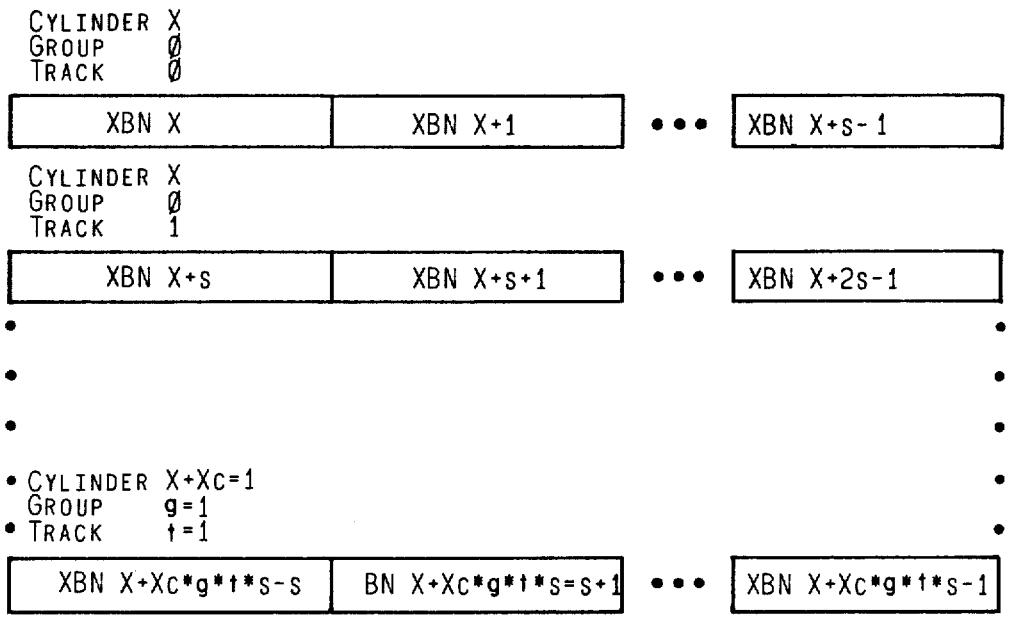
FIG. 17 is a diagrammatic illustration of the first two and the last tracks of the XBN space of a drive.

FIG. 17 illustrates the first two and last track in the XBN space of a subunit.

Diagnostic Cylinder Geometry

Figure 18:
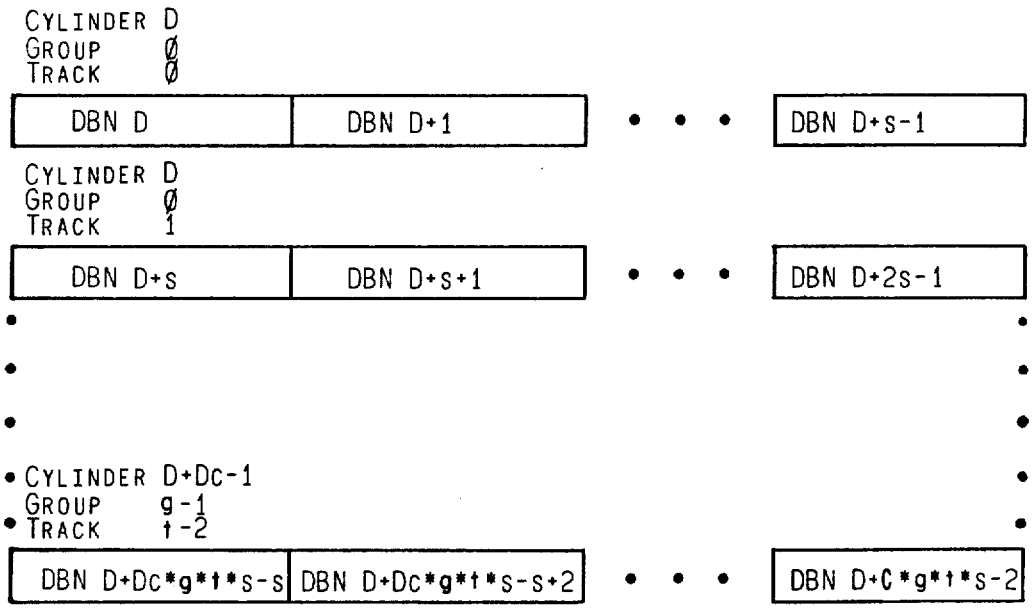
FIG. 18 is a diagrammatic illustration of the first two and the last tracks of the DBN space of a drive.

The diagnostic sectors on a drive are numbered logically from 0 to Ds−1, where $Ds = Dc*g*t*s$ is the total number of diagnostic sectors. The method for transforming DBN's to specific physical disk locations is described below. An adequate number of cylinders is reserved for diagnostic usage. Sector headers in those cylinders are coded to reflect that they are DBN's. These diagnostic cylinders are formatted initially in the 512 byte mode and the last cylinder in this space must remain in that mode; that cylinder contains various data patterns prerecorded at the factory. Diagnostic space geometry is illustrated in FIG. 18.

Address Conversions

Two generic variables are used to express the address conversion algorithms. They are actual or calculated device characteristics. The function QUO( ) is used to indicate a quotient resulting from a division operation and the function REM( ) is used to indicate the remainder resulting from a division operation.

The starting LBN for a drive (L) is computed from the characteristic "HISTRTLBN", the high order part of the address of the starting LBN. (see below). This is done by OR-ing the "HISTRTLBN" nibble into bits 27-24 of a previously zeroed longword.

Given a header LBN, the algorithm listed in FIG. 19 is used to determine the logical block's physical sector address. In reading that figure, note that the starting cylinder for a drive (C) is computed from the drive characteristic "HI CYL", the high order part of the cylinder address. This is done by OR-ing the "HI CYL" nibble into bits 30-28 of a previously zeroed longword. In the figure, "o" represents an offset.

Given a header RBN, the algorithm of FIG. 20 may be used to determine the replacement block's physical sector address. Note that the starting RBN for a drive (R) is computed from the characteristic "HISTRTRBN," the high order part of the RBN address. This is done by OR-ing the "HISTRTRBN" nibble into bits 27-24 of a previously zeroed longword.

Given a header XBN, the algorithm listed in FIG. 21 may be used to determine the external block's physical sector address. The starting XBN for a drive (X) is computed from the drive characteristic "HISTRTXBN," the high order part of the XBN address. This is done by OR-ing the "HISTRTXBN" nibble into bits 27-24 of a previously zeroed longword.

Given a header DBN, the controller executes the algorithm of FIG. 22 to determine the diagnostic block's physical sector address. The starting DBN for a drive (D) is computed from the characteristic "HISTRTDBN," the high order part of the DBN address. This is done by OR-ing the "HISTRTDBN" nibble into bits 27-24 of a previously zeroed longword.

Given a header LBN that has been revectored to the first RBN on the same track (primary RBN), then the following algorithm or formula may be used to determine the replacement block's RBN:

RBN=R+(QUO((LBN−L)/l))*r

Given a host LBN that has been revectored to the first RBN on the same track (primary RBN), then the following formula may be used to determine the replacement block's RBN:

RBN=R+(QUO((LBN)/l))*r

Given the physical address (cylinder, group and track) of a logical block that has revectored to the first RBN on the same track (primary RBN), then the following formula may be used to determine the replacement block's RBN:

RBN=R+([([(Cyl. No. −C)*g]+Group No.)*t]+Track No.)*r

Detailed Description of an Embodiment of the Functional Layer Revectoring

Once a sector has been replaced, revectoring should occur upon each access to the replaced LBN. Three revectoring mechanisms are supported by the particular implemention discussed herein. These mechanisms all depend upon values in the code field of the sector's header to initiate revectoring. Additionally, all revectored LBN's contain 128 copies of the replacement block's header in their data field, unless revectoring is the result of a header error. The revectoring mechanisms differ in the ways that the addresses of the target RBN's are determined.

In the primary revectoring mechanism, the position of the RBN to which revectoring is performed is implied by the position of the LBN on the volume. This implied position is the first replacement sector on the track containing the LBN. This is a many LBN to one RBN mapping function.

With so-called secondary revectoring, an arbitrary RBN is used whose address is determined by the presence of the 128 copies of the RBN's header value (code and address) in the data field of the bad LBN. The algorithm listed in FIG. 23 is used to determine reliably the correct value of the RBN header; it provides as output (from the 128 copies input) the address found to have at least 24 matches, if there is one.

Finally, there is a so-called tertiary revectoring mechanism which is used when the header compare algorithm fails to determine a valid header address or code or the algorithm of FIG. 23 fails to yield a valid result. It is important to determine then if the LBN has been revectored or if access to the LBN should result in an unrecoverable error. Since all revectored LBN's are recorded in the multiple copies of the RCT, an RCT search is used to determine if the bad LBN has been revectored. The RCT search algorithm, described above, results in the RBN address if the LBN was revectored, or a failure indication if it was not revectored. The determination that the attempted input/output operation was done to the correct sector requires, since the header is "smashed" and unusable (1) a determination that the correct cylinder, group and track have been selected; (2) for controllers that use sector counting via sector and index pulses, at least one revolution of counting after completion of the foregoing step and (3) for controllers that locate sectors by reading headers, at least four full revolutions searched after the foregoing step is complete. Failure to achieve a header match on the latter two actions requires invocation of tertiary revectoring.

Formatting Support

Formatting and reformatting processes are responsible for establishing which sectors are bad and replacing them, if they are in the host applications area, or formatting there headers with the unusable code if they are bad LBN's in the RCT, bad XBN's, bad DBN's or bad RBN's.

The formatting process is supported by the format control tables (FCT), which are used to record information about the location of manufacturing detected bad blocks. Format information for both 512 byte and 576 byte formats is stored in the FCT. The first subtable in the FCT contains information about where the bad blocks would be located if the disk were located in the 512 byte format, the second subtable contains information about where the bad blocks would be located if the disk were recorded in the 576 byte format. For those mass storage devices that don't support the 576 byte format, the 576 byte subtable contains null entries.

A second function of the FCT is the identification of the current mode of the LBN space (i.e., whether it is recorded in 512 or 576 byte format. The first sector of each FCT copy contains a code identifying the current LBN sector size. This mode identification sector is updated each time the volume is formatted.

The FCT contains at least one track of subsystem scratch storage also.

Figure 24:
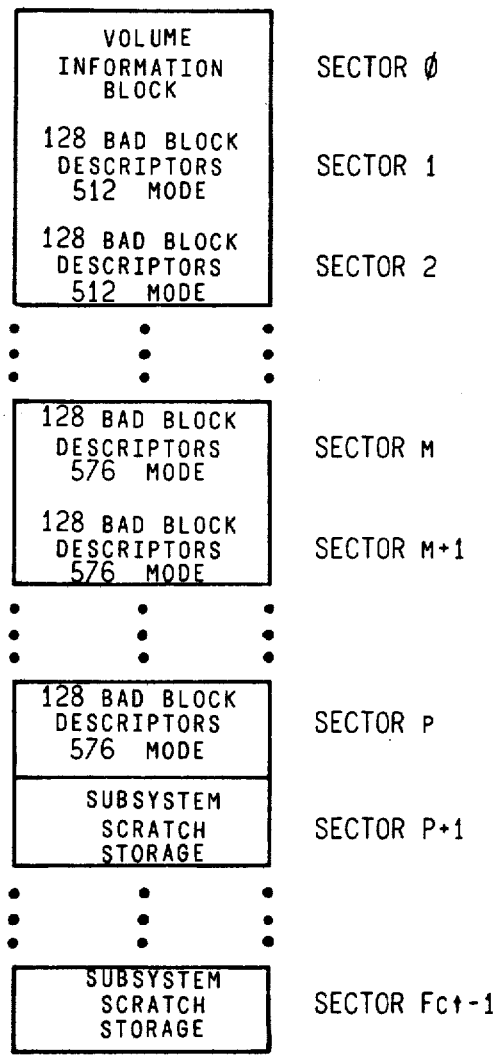
FIG. 24 is a diagrammatic illustration of the format of a copy of the FCT (format control table) in the XBN space of the present invention.

Each copy of the FCT is composed of one volume information block, one 512 byte format table, one 576 byte format table, and one subsystem temporary storage area (distributed amongst the alignment pads). This format is illustrated in FIG. 24. The XBN area itself is always formatted to contain 512 byte sectors. Sector 0 of the FCT contains various volume identification information. Its format is illustrated in FIG. 25.

Conclusion

Having thus described an exemplary embodiment of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed is:

1. In a secondary storage subsystem (2) for a data processing system (10), wherein data is recorded on a mass storage medium (5) and the smallest addressable unit of the medium is a sector (9), each sector including a header field for recording address information and a data field for recording data to be associated with and stored at such address, the improvement comprising:
   means (4, FIG. 13C-392) for writing in each sector a predetermined code, termed the forced error indicator, when the data being recorded in the data field is known to be logically corrupted and the medium underlying the sector is not known to be defective; and
   means (4, FIG. 13B-374) for providing a signal, termed a forced error signal, responsive to detection of the forced error indicator during a read operation.

2. The apparatus of claim 1 wherein the means for writing the forced error indicator code includes
   means (4, FIG. 13C-394) for generating for each sector an error detection code which is uniquely related to such sector's data, in accordance with a preselected algorithm, for use in detecting the presence of errors in reading data recorded in the sector; and
   means (3, 4, FIG. 13C) for writing a signal into a predetermined location in the sector (9, FIG. 11-334), such location being termed the EDC/FEI field, said signal being
   (a) the error detection code for the data being recorded in the sector when the data is not known to be logically corrupted (396), or
   (b) the forced error indicator code when the data being recorded in the sector is known to be logically corrupted (392).

3. The apparatus of claim 2 wherein the forced error indicator code is the one's complement of the error detection code for the data being recorded in the sector.

4. The apparatus of claim 3 further including:
   means (4, FIG. 13B-362) for generating a second error detection code upon reading the data recorded in a sector, using the preselected algorithm; and
   the means for providing a forced error signal comprising means for comparing the error detection code thus generated with the signal read from the EDC/FEI field (4, FIG. 13B-364, 370) and for generating the forced error indicator when the signal read from the EDC/FEI field corresponds to the one's complement of the second error detection code.

5. In a secondary storage subsystem for a data processing system, wherein data is recorded on a mass storage medium and the smallest addressable unit of the medium is a sector, a method of replacing a defective sector with a substitute sector, such that information to be written to or read from a defective sector is written to and then read from the substitute sector instead, once the defective sector is identified as unreliable, such method comprising the steps of:
   A. reserving a portion of the medium to be used as spare sectors for replacing defective sectors, at least one spare sector being provided within each set of sectors occupying contiguous logical locations on the medium;
   B. replacing the first defective sector in said set of sectors with the first one of said spare sectors, termed a primary replacement sector;
   C. indicating such replacement by writing a first predetermined code in the defective sector; and
   D. when writing data to or reading data from a sector, detecting the first predetermined code and, in response to detecting said code, revectoring the writing or reading operation to said first one of the spare sectors for the involved set of sectors where the code was detected.

6. The method of claim 5 wherein each sector comprises a header field and a data field, the address of the sector normally being written in the header field and the information to be stored in the sector being written in the data field, and further wherein said predetermined code is written in the header field of the defective sector.

7. The method of claim 6 wherein the reserved sectors are evenly distributed throughout the medium.

8. The method of claim 6 wherein the medium is a magnetic disk and the sets of sectors are tracks.

9. The method of claim 6 wherein the reserved sectors are located in predefined locations within said tracks.

10. The method of claim 6 further including the steps of, when the primary replacement sector is unavailable:
   D. selecting for a defective sector other than the first defective sector in said set of sectors a replacement sector other than the primary replacement sector, said replacement sector being termed a secondary replacement sector;
   E. in the header field of such defective sector, writing a second predetermined code indicating that said sector has been replaced by a secondary replacement sector;

F. in the data field of each such defective sector, writing a predetermined multiple number of copies of the physical address of the secondary replacement sector selected therefor;

G. on reading the header field of the defective sector, checking for said second code;

H. responsive to detecting said second code, obtaining the physical address of the secondary replacement sector by reading said multiple copies and comparing them statistically to arrive at the recorded value of said address; and I. revectoring the writing or reading operation intended for the defective sector to said secondary replacement sector.

11. The method of claim 10 wherein the reserved sectors are evenly distributed throughout the medium.

12. The method of claim 10 wherein the medium is a magnetic disk and the sets of sectors are tracks.

13. The method of claim 10 wherein the primary replacement sectors are located in predefined locations within said tracks.

14. The method of claim 10 further including the steps of, when the primary replacement sector is unavailable:

J. providing on the medium multiple copies of a table containing a list of each spare sector and the address of the defective sector replaced by it, if any;

K. responsive to detecting a defective sector, searching a copy of said table to find the address of the replacement sector therefor; and E. revectoring the writing or reading operation intended for the defective sector to said replacement sector.

15. In a secondary storage subsystem for a data processing system, wherein data is recorded on a mass storage medium and the smallest addressable unit of the medium is a sector, each sector comprising a header field and a data field, the address of the sector normally being written in the header field and the information to be stored in the sector being written in the data field, a method of replacing a defective sector with a substitute sector, such that information to be written to or read from a defective sector is written to and then read from the substitute sector instead, once the defective sector is identified as unreliable, such method comprising the steps of:

A. reserving a portion of the medium to be used as spare sectors for replacing defective sectors;

B. selecting for a defective sector a replacement sector from among said spare sectors;

C. in the header field of such defective sector, writing a predetermined code indicating that said sector has been replaced by a secondary replacement sector;

D. in the data field of a defective sector, writing a predetermined multiple number of copies of the physical address of the selected replacement sector therefor, termed a secondary replacement sector;

E. on reading the header field of the defective sector, checking for said second code;

F. responsive to detecting said second code, obtaining the physical address of the secondary replacement sector by reading said multiple copies and comparing them statistically to arrive at the recorded value of said address; and G. revectoring the writing or reading operation intended for the defective sector to said secondary replacement sector.

16. In a secondary storage subsystem for a data processing system, wherein data is recorded on a mass storage medium and the smallest addressable unit of the medium is a sector, a method of replacing a defective sector with a substitute sector, such that information to be written to or read from a defective sector is written to and then read from the substitute sector instead, once the defective sector is identified as unreliable, such method comprising the steps of:

A. reserving a portion of the medium to be used as spare sectors for replacing defective sectors;

B. selecting for a defective sector a replacement sector from among said spare sectors;

C. providing on the medium multiple copies of a table containing a list of each spare sector and the address of the defective sector replaced by it, if any;

D. responsive to detecting a defective sector, searching a copy of said table to find the address of the replacement sector therefor; and E. revectoring the writing or reading operation intended for the defective sector to said replacement sector.

17. In a disk drive for a secondary storage facility of a data processing system, wherein a read/write head must be positioned to read or write successive portions of the medium and the usable area of the storage medium is divided into sectors, each sector occupying a specific physical position relative to an index location on the medium and being available for reading or writing once per disk rotation, a method of reducing the time consumed in head repositioning, comprising the steps of:

A. logically grouping sectors into tracks, groups and cylinders according to access time latencies, a track being a set of sectors occupying contiguous logical disk locations, a group, being a set of tracks which can be selected within the time required for a sector to rotate past a head, and a cylinder being a collection of groups that can be selected by operations having latencies less than the time for a head-positioning seek operation;

tracks, groups and cylinders being independent of physical organization of the drive; and B. mapping the physical address of each sector to a logical track, group and cylinder address to effect optimal access time reduction.

18. In a secondary storage device, the improvement comprising: dividing the medium into multiple address spaces, at least two address spaces being addressable by a host computer system which uses the mass storage device and at least two address spaces being invisible to and not accessible by the host computer system;

the first address space addressable by the host computer system being the set of storage locations visible to an operating system of the host computer;

a second address space addressable by the host computer system being a space containing revector control tables for revectoring access to bad blocks on the medium;

the first address space not accessible by the host computer system comprising a region which provides formatting information;

a second address space not accessible by the host computer being adapted to contain diagnostic information.

* * * * *